US012420193B2

(12) United States Patent
Pan

(10) Patent No.: US 12,420,193 B2
(45) Date of Patent: Sep. 23, 2025

(54) METHOD AND APPARATUS FOR CONTROLLING VIRTUAL OBJECT, DEVICE, STORAGE MEDIUM, AND PROGRAM PRODUCT

(71) Applicant: TENCENT TECHNOLOGY (SHENZHEN) COMPANY LIMITED, Guangdong (CN)

(72) Inventor: Keyu Pan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 360 days.

(21) Appl. No.: 18/071,235

(22) Filed: Nov. 29, 2022

(65) Prior Publication Data

US 2023/0088206 A1 Mar. 23, 2023

Related U.S. Application Data

(63) Continuation of application No. PCT/CN2022/086768, filed on Apr. 14, 2022.

(30) Foreign Application Priority Data

May 13, 2021 (CN) .......................... 202110524511.3

(51) Int. Cl.
*A63F 13/58* (2014.01)
*A63F 13/56* (2014.01)
(Continued)

(52) U.S. Cl.
CPC .............. *A63F 13/56* (2014.09); *A63F 13/58* (2014.09); *A63F 13/69* (2014.09); *G06T 19/00* (2013.01); *A63F 13/44* (2014.09); *A63F 13/537* (2014.09)

(58) Field of Classification Search
None
See application file for complete search history.

(56) References Cited

U.S. PATENT DOCUMENTS

| 2007/0060335 A1* | 3/2007 | Sakaguchi | A63F 13/45 463/30 |
| 2007/0087801 A1* | 4/2007 | Kotani | A63F 13/58 463/8 |
| 2014/0128154 A1* | 5/2014 | Asano | A63F 13/795 463/29 |

FOREIGN PATENT DOCUMENTS

| CN | 108970116 A | 12/2018 |
| CN | 110141859 A | 8/2019 |

(Continued)

OTHER PUBLICATIONS

Final Fantasy Tactics game manual, Sony Playstation, 1997 (Year: 1997).*

(Continued)

*Primary Examiner* — Damon J Pierce
(74) *Attorney, Agent, or Firm* — Sughrue Mion, PLLC

(57) ABSTRACT

A method and an apparatus for controlling a virtual object, a device, and a computer-readable storage medium are provided. The method includes: presenting a first virtual object, a second virtual object interacting with the first virtual object, and round indication information in a virtual scene, the round indication information indicating a current round being for the first virtual object or the second virtual object to act; increasing an action parameter value of the first virtual object based on a round for the first virtual object ends and a round for the second virtual object begins; and controlling, based on an interaction execution instruction for the first virtual object is received, the first virtual object to (Continued)

execute an interaction operation for the second virtual object in the round for the second virtual object.

19 Claims, 13 Drawing Sheets

(51) Int. Cl.
  *A63F 13/69* (2014.01)
  *G06T 19/00* (2011.01)
  *A63F 13/44* (2014.01)
  *A63F 13/537* (2014.01)

(56) References Cited

FOREIGN PATENT DOCUMENTS

| CN | 110559663 A | 12/2019 |
|---|---|---|
| CN | 113144617 A | 7/2021 |
| JP | 2016-73490 A | 5/2016 |
| WO | 2019/062855 A1 | 4/2019 |
| WO | 2019/141175 A1 | 7/2019 |

OTHER PUBLICATIONS

YouTube video—"Final Fantasy Tactics: War of the Lions pt 1—Let's Play" https://www.youtube.com/watch?v=P1PnbuavER4 to GetDaved , Jan. 25, 2015 (Year: 2015).*
Office Action issued Aug. 19, 2024 in Japanese Application No. 2023-548961.
https://www.bilibili.com/video/BV1K4411B7hV/?spm_id_from=333.337.search-card.all_click&vd_source=4439190ed9ff529690cc1b4900aad, Aug. 30, 2019.
First Office Action of Chinese Application No. 202110524511.3 dated Oct. 25, 2022.
International Search Report of PCT/CN2022/086768 dated Jul. 11, 2022 [PCT/ISA/210].
Written Opinion of PCT/CN2022/086768 dated Jul. 11, 2022 [PCT/ISA/237].

* cited by examiner

METHOD AND APPARATUS FOR CONTROLLING VIRTUAL OBJECT, DEVICE, STORAGE MEDIUM, AND PROGRAM PRODUCT

CROSS REFERENCE TO RELATED APPLICATION(S)

This application is a continuation application of International Application No. PCT/CN2022/086768, filed Apr. 14, 2022, which claims priority to Chinese Patent Application No. 202110524511.3 filed on May 13, 2021, the disclosures of which are herein incorporated by reference in their entireties.

FIELD

The disclosure relates to the field of computer technologies, and in particular, to a method and an apparatus for controlling a virtual object, a device, a computer-readable storage medium, and a computer program product.

BACKGROUND

A display technology based on graphics processing hardware expands channels for perceiving environments and acquiring information, especially the display technology for virtual scenes, which can realize, according to actual application requirements, diversified interactions between virtual objects controlled by users or artificial intelligence and can be applied to various typical application scenes. For example, in a virtual scene of a game, a real battle process between the virtual objects can be simulated.

In the related art, a plurality of virtual objects are controlled in a manner in which different virtual objects share a progress bar. For example, based on a progress bar of a virtual object being full, the virtual object can be controlled to act. However, action logic of all virtual objects is the same, which leads to relatively poor flexibility in controlling the virtual objects.

SUMMARY

Example embodiments of the disclosure provide a method and an apparatus for controlling a virtual object, a device, a computer-readable storage medium, and a computer program product, which can improve flexibility of virtual object control.

Technical solutions of the example embodiments of the disclosure are implemented as follows:

According to an aspect of an example embodiment, a method for controlling a virtual object includes:
presenting a first virtual object, a second virtual object interacting with the first virtual object, and round indication information in a virtual scene,
the round indication information indicating a current round being for the first virtual object or the second virtual object to act;
increasing an action parameter value of the first virtual object based on a round for the first virtual object ending and a round for the second virtual object beginning; and
controlling, based on an interaction execution instruction for the first virtual object being received, the first virtual object to execute an interaction operation for the second virtual object in the round for the second virtual object.

According to an aspect of an example embodiment, an apparatus for controlling a virtual object includes:
at least one memory configured to store program code; and
at least one processor configured to read the program code and operate as instructed by the program code, the program code including:
display code configured to cause the at least one processor to present a first virtual object, a second virtual object interacting with the first virtual object, and round indication information in a virtual scene,
the round indication information indicating a current round being for the first virtual object or the second virtual object to act;
first control code configured to cause the at least one processor to increase an action parameter value of the first virtual object based on a round for the first virtual object ending and a round for the second virtual object beginning; and
second control code configured to cause the at least one processor to control, based on an interaction execution instruction for the first virtual object being received, the first virtual object to execute an interaction operation for the second virtual object in the round for the second virtual object.

An embodiment of this application provides a computer device, including:
a memory, configured to store executable instructions; and
a processor, configured to implement the method for controlling a virtual object provided by the embodiments of this application when executing the executable instructions stored in the memory.

According to an aspect of an example embodiment, a non-transitory computer-readable storage medium storing executable instructions, the executable instructions that, when executed by a processor, causes the at least one processor to:
present a first virtual object, a second virtual object interacting with the first virtual object, and round indication information in a virtual scene, the round indication information indicating a current round being for the first virtual object or the second virtual object to act; increase an action parameter value of the first virtual object based on a round for the first virtual object ending and a round for the second virtual object beginning; and control, based on an interaction execution instruction for the first virtual object being received, the first virtual object to execute an interaction operation for the second virtual object in the round for the second virtual object.

According to an aspect of an example embodiment, a computer program product includes a computer program or instructions, the computer program or the instructions, when executed by a processor, implementing the method for controlling a virtual object provided by the embodiments of the disclosure.

The embodiments of the disclosure have the following beneficial effects:

By applying the example embodiments of the disclosure, a first virtual object, a second virtual object interacting with the first virtual object, and round progress indication information are presented in a virtual scene, the round progress indication information indicating a progress of interaction between the first virtual object and the second virtual object in a current round; an action parameter value of the first virtual object is increased based on the round progress indication information indicating that the interaction in the current round ends, and a picture in which the second virtual object acts is displayed; and in an action progress of the second virtual object, the first virtual object is controlled to execute an interaction operation for the second virtual object based on an interaction execution instruction for the first virtual object being received. In this way, based on the current round ending, only the action parameter value of the first virtual object is increased and there is no need to immediately control the first virtual object to execute the interaction operation for the second virtual object, which enables a timing for the first virtual object to execute the interaction operation for the second virtual object to be more flexibly. In addition, the second virtual object acts only based on the current round ending, so that a user can predict a behavior of the second virtual object, thereby controlling the first virtual object more effectively.

DETAILED DESCRIPTION

Figure 1:
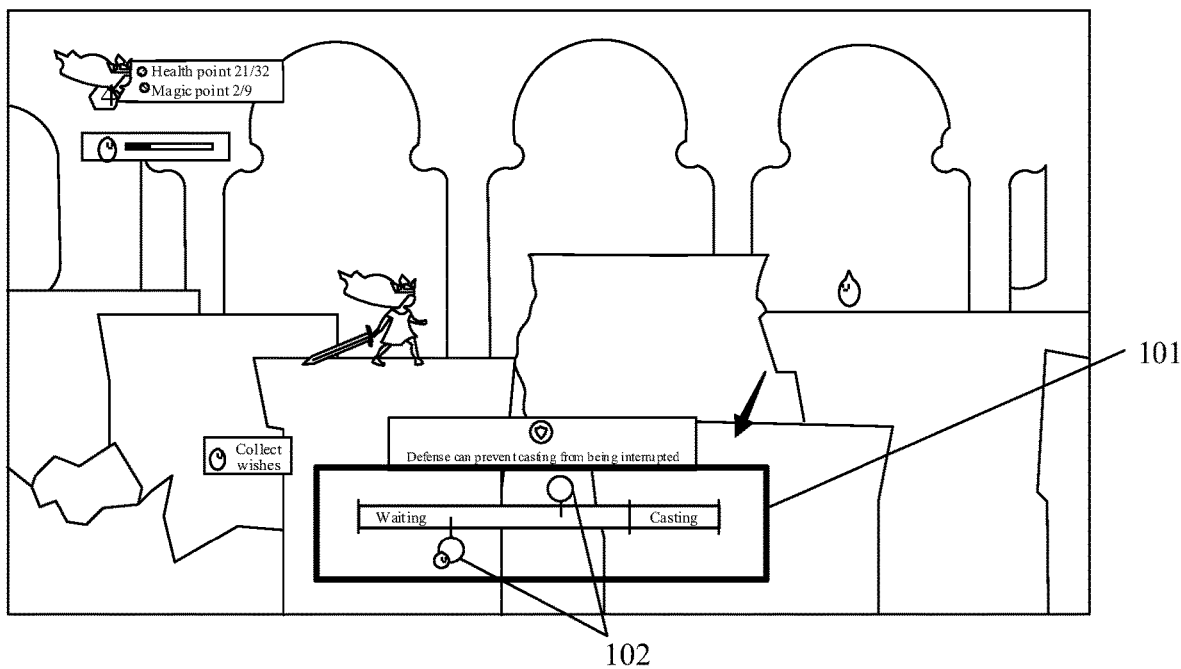
FIG. 1 is a schematic diagram of a picture of a virtual scene according to an example embodiment of the disclosure.

To make objectives, technical solutions, and advantages of the disclosure clearer, the following describes the disclosure in further detail with reference to the accompanying drawings. The described example embodiments are not to be considered as a limitation to the disclosure. All other embodiments obtained by a person of ordinary skill in the art without creative efforts shall fall within the protection scope of the disclosure.

In the following descriptions, related "some embodiments" or "some example embodiments" describe a subset of all possible embodiments. However, it may be understood that the "some embodiments" or "some example embodiments" may be the same subset or different subsets of all the possible embodiments, and may be combined with each other without conflict.

In the following descriptions, the comprised term "first/second" is merely intended to distinguish similar objects but does not necessarily indicate a specific order of an object. It may be understood that "first/second" is interchangeable in terms of a specific order or sequence if permitted, so that the embodiments of the disclosure described herein can be implemented in a sequence in addition to the sequence shown or described herein.

Before the example embodiments of the disclosure are further described in detail, nouns and terms involved in the example embodiments of the disclosure are described. The nouns and terms provided in the example embodiments of the disclosure are applicable to the following explanations.

1) The client refers to an application such as a video playback client or a game client that is run on a terminal and that is configured to provide various services.

2). The expression "in response to" is used for representing a condition or a state on which an executed operation depends. In a case that the condition or the state is satisfied, one or more executed operations may be real-time or have a set delay. Unless otherwise specified, there is no limitation on the order in which the plurality of operations are executed.

3) The virtual scene refers to a virtual scene displayed (or provided) in a case that an application is run on a terminal. The virtual scene may be a simulated environment of a real world, or may be a semi-simulated and semi-fictional virtual environment, or may be an entirely fictional virtual environment. The virtual scene may be any one of a two-dimensional virtual scene, a 2.5-dimensional virtual scene, or a three-dimensional virtual scene, and the dimension of the virtual scene is not limited in the example embodiments of the disclosure. For example, the virtual scene may include the sky, the land, the ocean, or the like. The land may include environmental elements such as a desert and a city. The user may control the virtual object to move in the virtual scene.

4). The virtual object refers to images of various people and objects that can interact in a virtual scene, or a movable object in the virtual scene. The movable object may be a virtual character, a virtual animal, a cartoon character, or the like, for example, a character, an animal, a plant, an oil drum, a wall, or a stone displayed in a virtual scene. The virtual object may be a virtual avatar for representing a user in the virtual scene. The virtual scene may include a plurality of virtual objects. Each virtual object has a shape and a volume in the virtual scene, and occupies a part of the space in the virtual scene.

Optionally, the virtual object may be a player character controlled through an operation on a client, or may be an artificial intelligence (AI) character set in a virtual scene battle through training, or may be a non-player character (NPC) set in a virtual scene interaction. Optionally, the virtual object may be a virtual character performing adversarial interaction in a virtual scene. Optionally, a quantity of virtual objects participating in the interaction in the virtual scene may be preset, or may be dynamically determined according to a quantity of clients participating in the interaction.

5). Scene data represents various characteristics shown by an object during interaction in a virtual scene, for example, a position of the object in the virtual scene may be included. Certainly, different types of characteristics may be included according to a type of the virtual scene. For example, in a virtual scene of a game, the scene data may include a waiting time (which depends on a quantity of times that a same function can be used within a certain time) for configuring various functions in the virtual scene, and may also represent attribute values of a game character in various states, for example, including a health point (also referred to as a blood volume), a magic point (also referred to as mana), and the like.

In the related art, in a case that virtual objects in a virtual scene are controlled, for example, for virtual objects in a semi-real-time and semi-turn-based game, a manner in which different virtual objects share a loading bar is used. For example, FIG. 1 is a schematic diagram of a picture of a virtual scene according to an example embodiment of the disclosure. Referring to FIG. 1, a progress bar 101 is displayed in the picture of the virtual scene, and object identifiers 102 corresponding to virtual objects move along the progress bar to read the bar. For each virtual object, the virtual object starts to act when reading to the end of the bar. Reading speeds of the virtual objects may be different, and therefore, within a same time, a virtual object with a faster speed may act a few more rounds than a virtual object with a slower speed.

The applicant finds in a process of implementing the example embodiments of the disclosure that, in the related art, although the reading speeds of different virtual objects may be different, in a case that a certain virtual object starts to act after finishing reading, other virtual objects need to wait for the virtual object to finish an action before continuing to read the bar, otherwise, the other virtual objects need to wait in place, resulting in discontinuous control over the virtual objects. In addition, action logic of all virtual objects is consistent, that is, the virtual objects start to act when reading to the end of the bar, which leads to a problem of poor flexibility in the control the virtual objects.

Based on the above, the example embodiments of the disclosure provide a method and an apparatus for controlling a virtual object, a device, a computer-readable storage medium, and a computer program product, to resolve at least the foregoing problems in the related art, and descriptions are respectively provided below.

Figure 2:
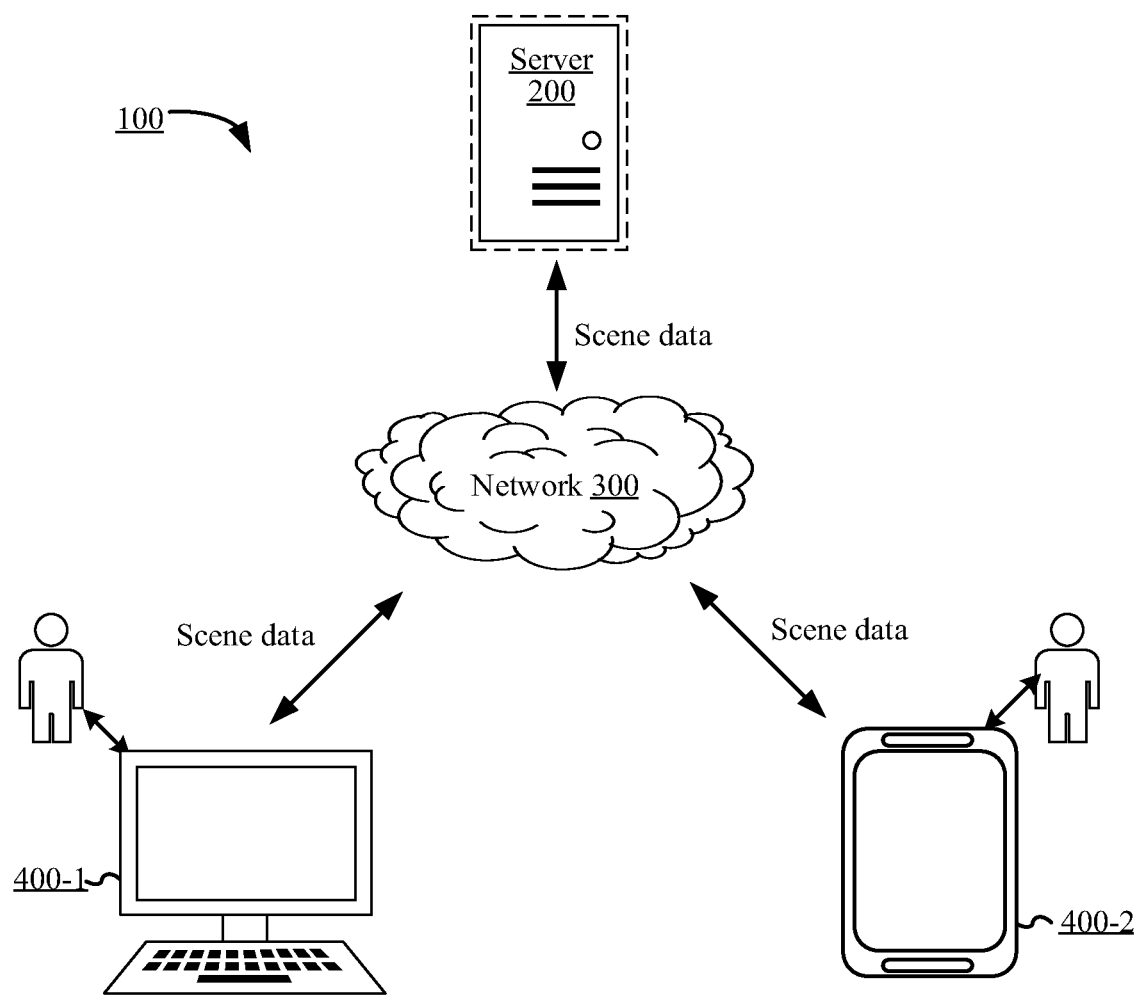
FIG. 2 is a schematic diagram of an implementation scene of a method for controlling a virtual object according to an example embodiment of the disclosure.

FIG. 2 is a schematic diagram of an implementation scene of a method for controlling a virtual object according to an example embodiment of the disclosure. To support an exemplary application, terminals (where a terminal 400-1 and a terminal 400-2 are exemplarily shown) are connected to a server 200 by using a network 300. The network 300 may be a wide area network, a local area network, or a combination of the two. Data transmission is implemented by using a radio link.

In some example embodiments, the server 200 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. The terminal may be a smartphone, a tablet computer, a notebook computer, a desktop computer, a smart speaker, a smart watch, or the like, but is not limited thereto. The terminal and the server may be directly or indirectly connected in a wired or wireless communication manner. This is not limited in this example embodiment of the disclosure.

In actual implementation, an application supporting a virtual scene is installed on the terminal. The application may be any one of a massive multiplayer online role-playing game (MMORPG), a first-person shooting (FPS) game, a third-person shooting game, a multiplayer online battle arena (MOBA) game, a virtual reality application, a three-dimensional map program, or a multiplayer gunfight survival game. A user uses the terminal to operate a virtual object in the virtual scene to perform a movement. The movement includes, but is not limited to, at least one of body posture adjustment, crawling, walking, running, cycling, jumping, driving, picking-up, shooting, attacking, and throwing. For example, the virtual object is a virtual character such as a simulated character role or a cartoon character role.

In an exemplary scene, a virtual object (a first virtual object) controlled by the terminal 400-1 and a virtual object (a second virtual object) controlled by another terminal (for example, the terminal 400-2) or a virtual object (the second virtual object) controlled by artificial intelligence are in the same virtual scene. In this case, the first virtual object can interact with the second virtual object in the virtual scene. In some example embodiments, the first virtual object and the second virtual object may be in an opposing relationship, for example, the first virtual object and the second virtual object belong to different teams and organizations.

In an exemplary scene, the first virtual object, the second virtual object interacting with the first virtual object, and round progress indication information in the virtual scene are presented on the terminal, the round progress indication information indicating a progress of interaction between the first virtual object and the second virtual object in a current round; an action parameter value of the first virtual object is increased in a case that the round progress indication information indicates that the interaction in the current round ends, and a picture in which the second virtual object acts is displayed; and in an action progress of the second virtual object, the first virtual object is controlled to execute an interaction operation for the second virtual object in a case that an interaction execution instruction for the first virtual object is received.

During actual implementation, the server 200 computes scene data in the virtual scene and transmits the scene data to the terminal. The terminal relies on graphics computing hardware to complete loading, parsing and rendering of the computed display data, and relies on graphics output hardware to output the virtual scene to form visual perception. For example, a two-dimensional video frame can be presented on a display screen of a smartphone, or a frame that implements a three-dimensional display effect can be projected on lenses of augmented reality/virtual reality glasses. For the perception of a form of the virtual scene, it may be understood that corresponding hardware output of the terminal may be used, for example, microphone output is used to form auditory perception, vibrator output is used to form tactile perception, and the like.

The terminal runs a client (for example, a network game application) and performs game interaction with another user by connecting to the server 200. The terminal outputs a picture of the virtual scene, and the picture includes the first virtual object, the second virtual object interacting with the first virtual object, and the round progress indication information. The first virtual object herein is a game character controlled by the user, that is, the first virtual object is controlled by a real user and executes the interaction operation for the second virtual object in the virtual scene in response to an operation by the real user on a controller (including a touch screen, a voice-activated switch, a keyboard, a mouse, a joystick, and the like). For example, in a case that the real user triggers an attack button, the first virtual object executes an attack operation for the second virtual object. The second virtual object herein is a game character controlled by the server, that is, the second virtual object is not controlled by a real user. Instead, a developer of the game presets a to-be-executed action by the second virtual object in a case that each round ends, and a corresponding action is executed in a case that a certain round ends.

For example, the action parameter value of the first virtual object is increased in a case that the round progress indication information indicates that the interaction in the current round ends, and a picture in which the second virtual object executes an action corresponding to the round is displayed. Herein, the user may trigger the interaction execution instruction for the first virtual object at any moment, to control the first virtual object to execute the interaction operation for the second virtual object, and the corresponding action parameter value may be reduced. For example, in a case that the action parameter value is used for indicating a quantity of executable times that the first virtual object executes the interaction operation, the action parameter value is reduced by a corresponding value every time the first virtual object executes the interaction operation for the second virtual object.

Figure 3:
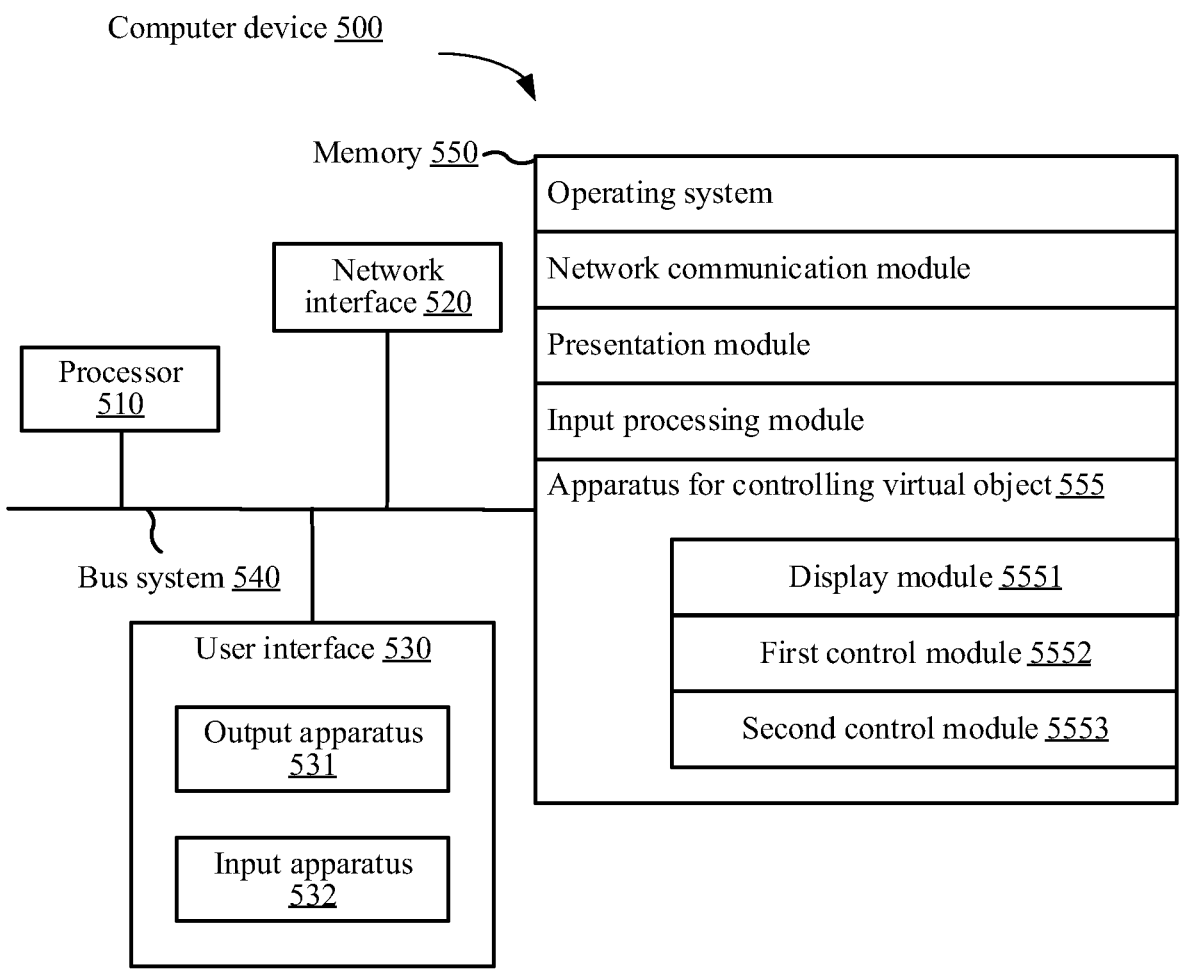
FIG. 3 is a schematic structural diagram of a computer device 500 according to an example embodiment of the disclosure.

FIG. 3 is a schematic structural diagram of a computer device 500 according to an example embodiment of the disclosure. In actual application, the computer 500 may be the terminal or the server 200 shown in FIG. 2. Using an example in which the computer device is the terminal shown in FIG. 2, the computer device implementing the method for controlling a virtual object according to the example embodiments of the disclosure is described. The computer device 500 shown in FIG. 3 includes at least one processor 510, a memory 550, at least one network interface 520, and a user interface 530. Various components in the computer device 500 are coupled together via a bus system 540. It may be understood that the bus system 540 is configured to implement connection and communication between the components. In addition to a data bus, the bus system 540 further comprises a power bus, a control bus, and a state signal bus. However, for ease of clear description, all types of buses are marked as the bus system 540 in FIG. 3.

The processor 510 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The user interface 530 includes one or more output apparatuses 531 that enable presentation of media content, including one or more speakers and/or one or more visual display screens. The user interface 530 further includes one or more input apparatuses 532, including user interface components that facilitate inputting of a user, such as a keyboard, a mouse, a microphone, a touch display screen, a camera, and another input button and control.

The memory 550 may be a removable memory, a non-removable memory, or a combination thereof. An exemplary hardware device includes a solid-state memory, a hard disk drive, an optical disc driver, and the like. The memory 550 optionally includes one or more storage devices that are physically away from the processor 510.

The memory 550 includes a volatile memory or a non-volatile memory, or may include both the volatile memory and the non-volatile memory. The non-volatile memory may be a read only memory (ROM), and the non-volatile memory may be a random access memory (RAN). The memory 550 described in this example embodiment of the disclosure is intended to include any suitable type of memory.

In some example embodiments, an apparatus for controlling a virtual object provided in this example embodiment of the disclosure may be implemented by using software. FIG. 3 shows an apparatus 555 for controlling a virtual object stored in the memory 550. The apparatus 555 may be software in a form such as a program and a plug-in, and includes the following software modules: a display module 5551, a first control module 5552, and a second control module 5553. These modules are logical modules, and therefore may be randomly combined or further divided according to an implemented function.

Functions of the modules are described below.

In some other example embodiments, the apparatus for controlling a virtual object provided in this example embodiment of the disclosure may be implemented by using hardware. For example, the apparatus for controlling a virtual object provided in this example embodiment of the disclosure may be a processor in a form of a hardware decoding processor, programmed to execute the method for controlling a virtual object provided in the example embodiments of the disclosure. For example, the processor in the form of a hardware decoding processor may use one or more application-specific integrated circuits (ASIC), a DSP, a programmable logic device (PLD), a complex programmable logic device (CPLD), a field-programmable gate array (FPGA), or other electronic components.

The method for controlling a virtual object provided in the example embodiments of the disclosure is described with reference to the exemplary application and implementation of the terminal provided in this example embodiment of the disclosure.

Figure 4:
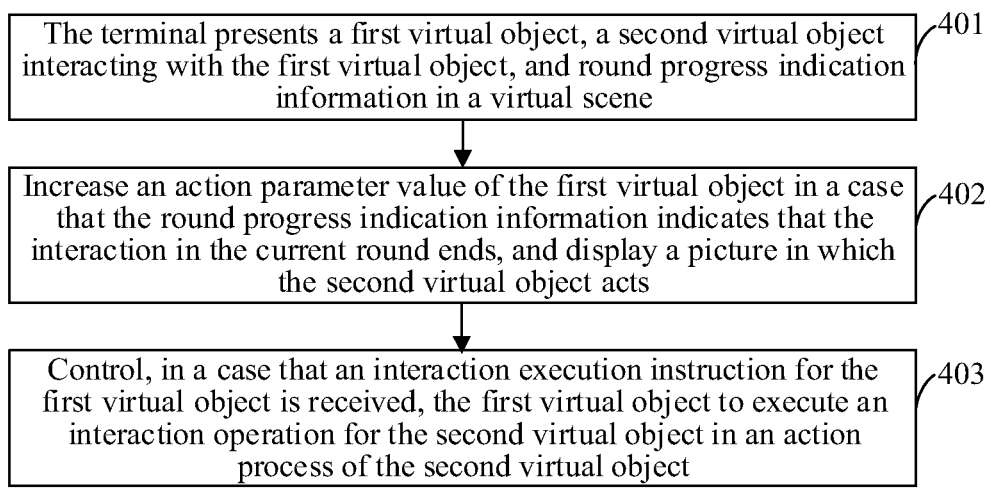
FIG. 4 is a schematic flowchart of a method for controlling a virtual object according to an example embodiment of the disclosure.

FIG. 4 is a schematic flowchart of a method for controlling a virtual object according to an example embodiment of the disclosure. Descriptions are made with reference to operations shown in FIG. 4.

Operation 401: The terminal presents a first virtual object, a second virtual object interacting with the first virtual object, and round progress indication information in a virtual scene.

The round progress indication information is used for indicating a progress of interaction between the first virtual object and the second virtual object in a current round. The round progress indication information may be displayed in a form such as a bar shape (for example, a progress bar), a disc shape (for example, disc scanning), or a digital countdown, and a specific display form of the round progress indication information is not limited herein. During actual implementation, durations of rounds may be the same or different, and this is not limited herein.

In actual application, an application supporting the virtual scene is installed on the terminal. The application may be any one of a massive multiplayer online role-playing game, a first-person shooting game, a third-person shooting game, a multiplayer online battle arena (MOBA) game, a virtual reality application, a three-dimensional map program, or a multiplayer gunfight survival game. A user may use the terminal to operate a virtual object in the virtual scene to perform a movement. The movement includes, but is not limited to, at least one of body posture adjustment, crawling, walking, running, cycling, jumping, driving, picking-up, shooting, attacking, and throwing. For example, the virtual object is a virtual character such as a simulated character role or a cartoon character role.

In a case that a user opens the application on the terminal and the terminal runs the application, the terminal transmits an acquisition request for scene data of the virtual scene to the server. The server acquires, based on a scene identifier carried in the acquisition request, the scene data of the virtual scene indicated by the scene identifier, and returns the acquired scene data to the terminal. The terminal performs picture rendering based on the received scene data, presents a picture of the virtual scene, and presents, in the picture of the virtual scene, the first virtual object, the second virtual object interacting with the first virtual object, and the round progress indication information in the virtual scene. Herein, the picture of the virtual scene is obtained by observing the virtual scene from a first-person object perspective or from a third-person perspective. The picture of the virtual scene includes interaction objects and an object interaction environment, for example, a virtual object controlled by a current user and a virtual vehicle taken by the virtual object.

Figure 5:
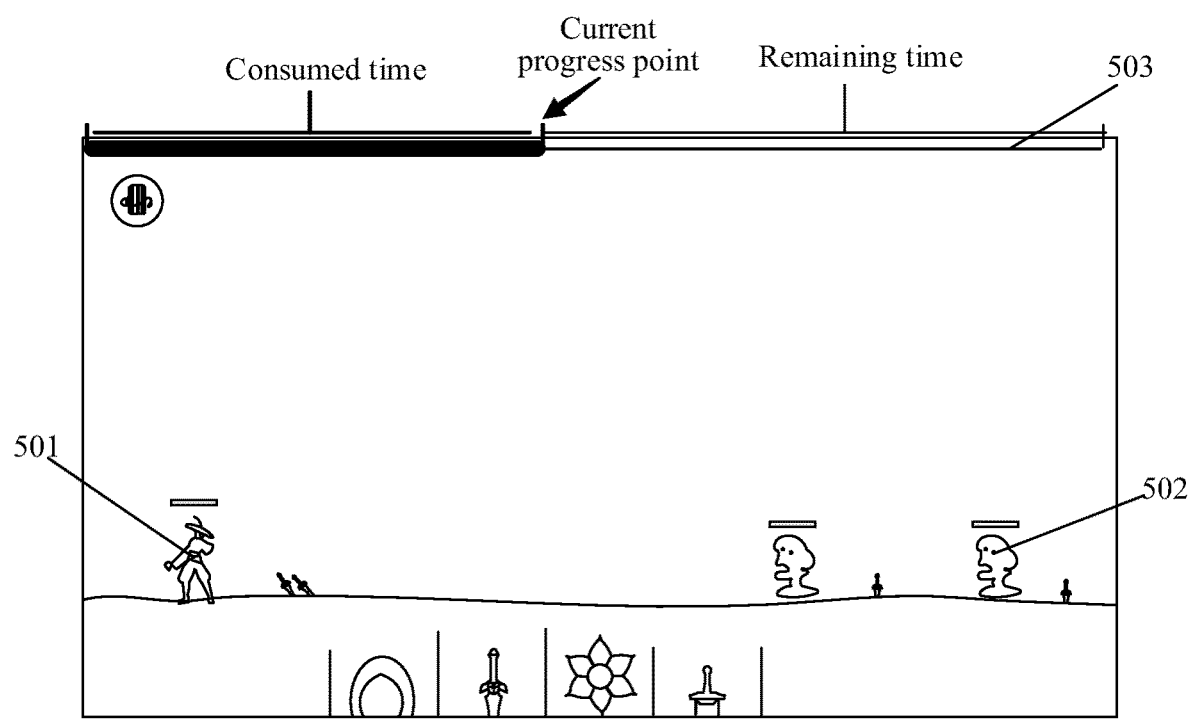
FIG. 5 is a schematic diagram of a picture of a virtual scene according to an example embodiment of the disclosure.

In an example, FIG. 5 is a schematic diagram of a picture of a virtual scene according to an example embodiment of the disclosure. Referring to FIG. 5, a first virtual object 501, a second virtual object 502, and round progress indication information 503 are presented in the picture of the virtual scene. The round progress indication information is presented in a form of a progress bar. During the current round, a consumed time indicated by the progress bar keeps increasing, and a corresponding current progress point keeps moving to the right until the current progress point moves to the end of the progress bar. Herein, the progress of the interaction between the first virtual object and the second virtual object in the current round can be learned according to a position of the current progress point.

Step 402: Increase an action parameter value of the first virtual object in a case that the round progress indication information indicates that the interaction in the current round ends, and display a picture in which the second virtual object acts.

Herein, the action parameter value is used for the user to trigger an interaction execution instruction for the first virtual object based on the action parameter value, to control the first virtual object to execute an interaction operation for the second virtual object. After the interaction execution instruction is triggered (that is, the interaction operation is executed), the action parameter value is consumed.

In actual application, in a case that the interaction in the current round ends, the picture in which the second virtual object acts is immediately displayed. However, the first virtual object does not act, but merely increases the action parameter value. In a case that the user needs to control the first virtual object to execute the interaction operation, the user triggers the interaction execution instruction.

In some example embodiments, the terminal may further cyclically display the round progress indication information in the picture of the virtual scene, where each cycle corresponds to a round, and for each cycle, a change of a display form of the round progress indication information matches a change of a progress of a corresponding round.

During actual implementation, a round time is continuously consumed, that is, a next round is immediately entered in a case that interaction in a round ends. In an ongoing process of each round, with a change of a progress of the round, a process in which the display form of the round progress indication information changes is displayed.

Figure 6:
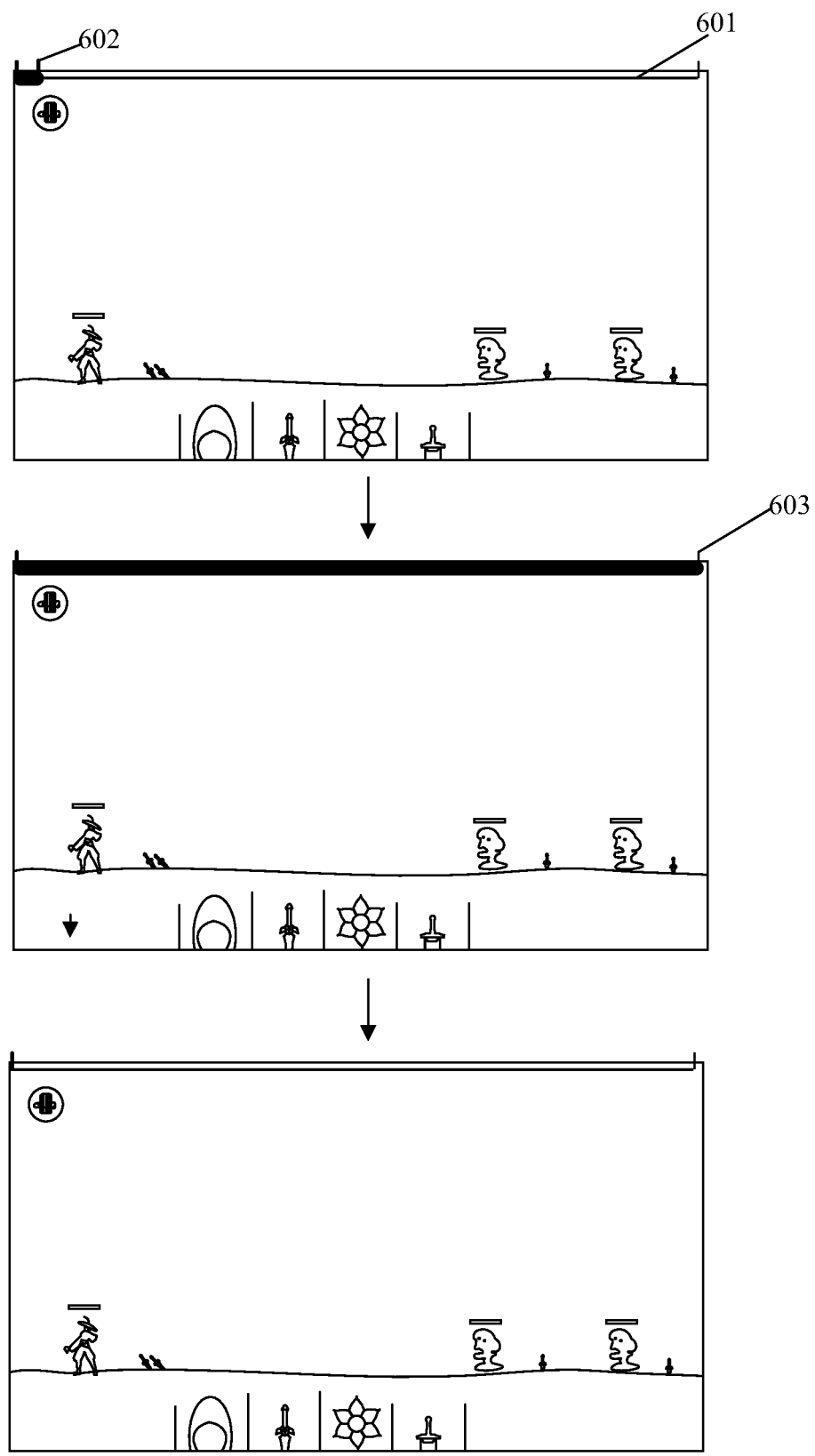
FIG. 6 is a schematic diagram of a picture of a virtual scene according to an example embodiment of the disclosure.

In an example, FIG. 6 is a schematic diagram of a picture of a virtual scene according to an example embodiment of the disclosure. Referring to FIG. 6, in the picture of the virtual scene, round progress indication information 601 is displayed in a form of a progress bar. Herein, in an ongoing process of each round, with a change of a progress of the round, a progress in which a current progress point 602 moves from a start position of the progress bar to an end position is displayed, that is, a progress in which the current progress point 602 moves from left to right is displayed. Herein, in a case that the current progress point moves to the end position 603, it indicates that the interaction in the current round ends. In this case, the current progress point returns to the start position, to re-enter a next round again. Then, in the next round that is newly entered, a progress in which the current progress point moves from the start position to the end position is displayed, to cyclically display the round progress indication information.

Figure 7:
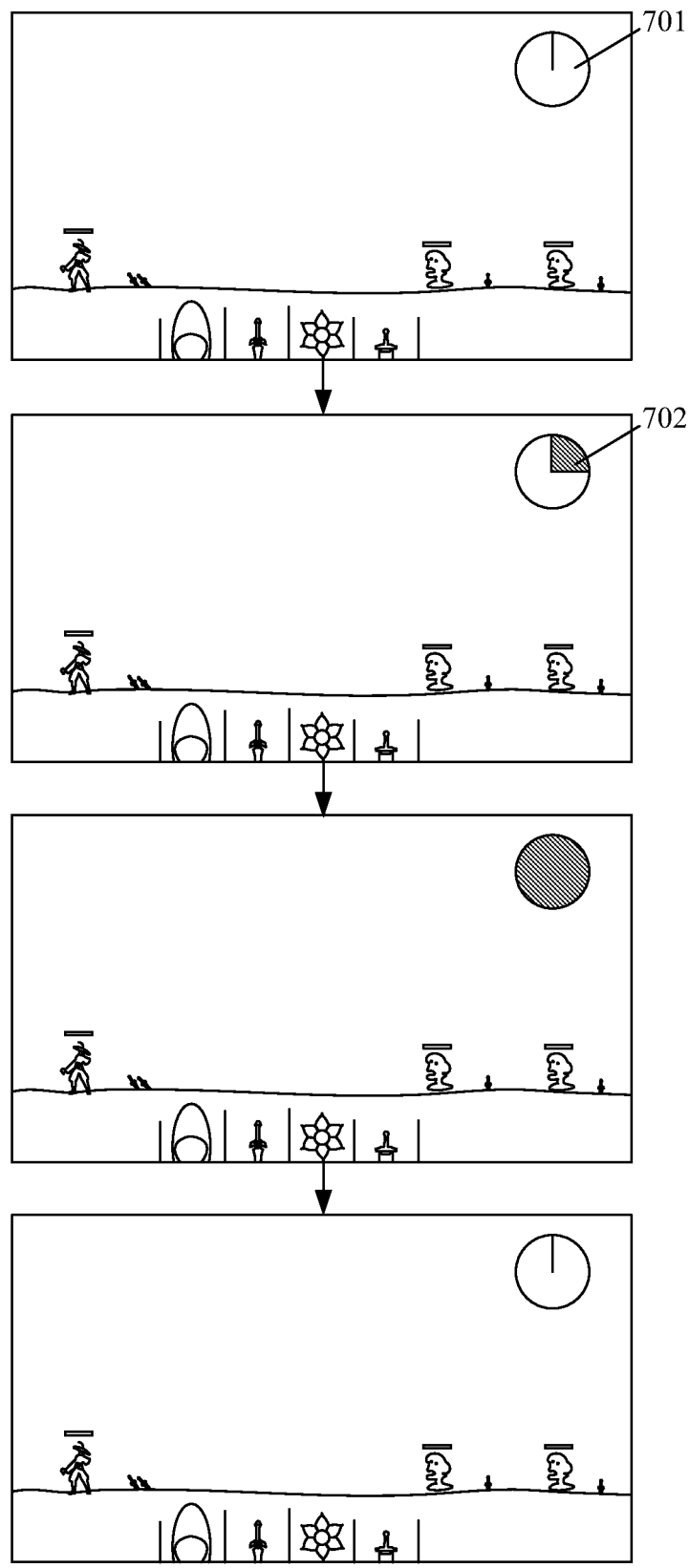
FIG. 7 is a schematic diagram of a picture of a virtual scene according to an example embodiment of the disclosure.

In an example, FIG. 7 is a schematic diagram of a picture of a virtual scene according to an example embodiment of the disclosure. Referring to FIG. 7, in the picture of the virtual scene, round progress indication information 701 is displayed in a form of a disc. Herein, in an ongoing progress of each round, with a change of a progress of the round, a progress in which a gray sectoral area 702 gradually enlarges from zero is displayed. Herein, in a case that the gray sectoral area is enlarged to be an area of the disc, it indicates that the interaction in the current round ends. In this case, gray in the disc is recovered to white, that is, a next round is re-entered, and a progress in which the gray sectoral area 702 gradually enlarges from zero in the next round that is newly entered is displayed, to cyclically display the round progress indication information.

In some example embodiments, the terminal may increase the action parameter value of the first virtual object in the following manner: controlling a target quantity of action identifiers to be increased in an associated region of the first virtual object in a case that the round progress indication information indicates that the interaction in the current round ends, to indicate that the action parameter value of the first virtual object is increased, where the associated region is used for presenting a quantity of action identifiers corresponding to the action parameter value.

During actual implementation, the terminal may present the quantity of action identifiers corresponding to the action parameter value in the associated region. For example, the action parameter value is consistent with a quantity of the action identifiers, for example, in a case that the action parameter value is 3, 3 action identifiers are presented. In a case that the action parameter value is zero, no action identifier is presented in the associated region, to avoid unnecessary occupation of the display screen. In a case that the round progress indication information indicates that the interaction in the current round ends, the quantity of the action identifiers in the associated region of the first virtual object is controlled to be correspondingly increased due to an increase in the action parameter value. For example, one action identifier is added in a case that the interaction in each round ends, to indicate that the action parameter value is increased by one.

Figure 8:
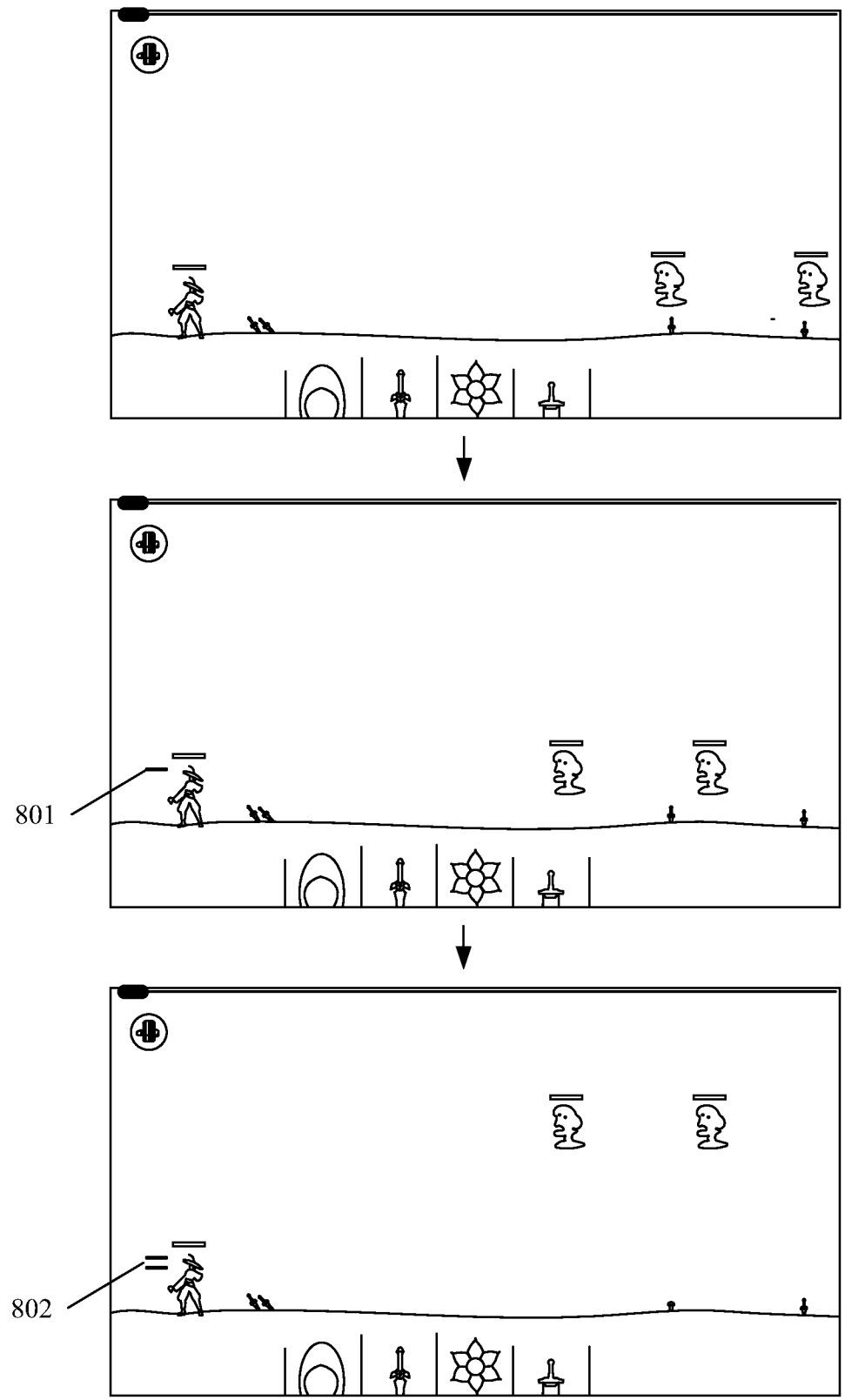
FIG. 8 is a schematic diagram of a process in which an action parameter value increases according to an example embodiment of the disclosure.

In an example, an example in which the action parameter value is controlled to be increased by one in a case that the interaction in each round ends is used. Herein, the action parameter value is consistent with the quantity of the action identifiers. FIG. 8 is a schematic diagram of a process in which an action parameter value increases according to an example embodiment of the disclosure. Referring to FIG. 8, the action parameter value is 0 in an interaction process in a first round, and in this case, no action identifier is presented in the picture of the virtual scene; one action identifier 801 is displayed in the associated region of the first virtual object in a case that interaction in the first round ends, to indicate that the action parameter value is increased from 0 to 1; and two action identifiers 802 are displayed in the associated region of the first virtual object in a case that interaction in a second round ends, that is, a new action identifier is added, to indicate that the action parameter value increased from 1 to 2.

In some example embodiments, the terminal may increase the action parameter value of the first virtual object in the following manner: controlling, in a case that the action parameter value is represented by using a display style of an action identifier and the round progress indication information indicates that the interaction in the current round ends, a display style of an action identifier of the first virtual object to be changed from a first display style to a second display style, where the first display style corresponds to the action parameter value of the first virtual object in a case that the interaction ends, and the second display style corresponds to an action parameter value corresponding to a unit round.

In actual application, the first display style is different from the second display style. In a case that the action parameter value is identified by using the display style of the action identifier, correspondences between various action parameter values and display styles may be preset. The first display style herein corresponds to the action parameter value of the first virtual object, that is, the first display style corresponds to a value before the action parameter value is increased. The second display style corresponds to the action parameter value corresponding to the unit round, that is, the second display style corresponds to a value after the action parameter value is increased.

The display style herein may be a color, a size, a pattern, or the like, and a specific display style is not limited herein.

In an example, in a case that the action parameter value is respectively 1, 2, 3, or 4, a corresponding display style is respectively red, orange, yellow, or green. In this case, assuming that the action parameter value of the first virtual object is 2 in a case that the interaction ends, the action identifier of the first virtual object is displayed in orange. Since the action parameter value is controlled to be increased in a case that the interaction ends, assuming that the action parameter value is increased by 1 and the action parameter value after increasing 1 is 3, the second display style is yellow and a color of the action identifier is switched from orange to yellow, to indicate that the action parameter value of the first virtual object is increased from 2 to 3.

In some example embodiments, the terminal may increase the action parameter value of the first virtual object in the following manner: acquiring a state parameter of the virtual scene and an action parameter value corresponding to a unit round corresponding to the state parameter in a case that the round progress indication information indicates that the interaction in the current round ends, where the state parameter includes at least one of the following: a task difficulty coefficient, a task progress, or object information of the first virtual object; and increasing the action parameter value of the first virtual object, where a corresponding increased value is the action parameter value corresponding to the unit round.

During actual application, correspondences between different state parameters and the action parameter value corresponding to the unit round may be preset. For example, the higher the task difficulty coefficient is, the higher the action parameter value corresponding to the unit round is. The state parameter of the virtual scene is acquired in a case that the interaction in the current round ends. Then, the action parameter value corresponding to the unit round corresponding to the state parameter is determined according to the correspondence between the state parameter and the action parameter value corresponding to the unit round, and the action parameter value of the first virtual object is controlled to be increased by the action parameter value corresponding to the unit round.

The state parameter herein may be one or more of the task difficulty coefficient, the task progress, or object information of the first virtual object. For example, in a case that the state parameter is only the task difficulty coefficient, an action parameter value corresponding to a corresponding unit round may be set for each task difficulty coefficient. For example, the task difficulty coefficient includes 1, 2, and 3, and the action parameter value corresponding to the corresponding unit round may be 1, 2, and 3. In this case, in a case that the task difficulty coefficient is 1, the action parameter value of the first virtual object is controlled to be increased by 1, and in a case that the task difficulty coefficient is 2, the action parameter value of the first virtual object is controlled to be increased by 2.

In an example, the state parameter includes the task difficulty coefficient, the task progress, and the object information of the first virtual object. In a case that the virtual scene is a game, the task difficulty coefficient may be a difficulty coefficient of a current game level, and a next game level may be entered after a task of the current game level is completed. The task progress may be a progress of task completion, for example, in a case that the task is to kill 10 second virtual objects, and 5 second virtual objects have been killed currently, then the task process is 50%. The object information of the first virtual object may be a level of the first virtual object, for example, the higher the level is, the higher the action parameter value corresponding to the unit round is, that is, the higher value the action parameter value is increased by. Herein, the increased value is determined by integrating the three state parameters. For example, increased values (the action parameter value corresponding to the unit round) corresponding to the state parameters may be determined respectively, and then an average value of the increased values corresponding to the plurality of state parameters is used as a final increased value. For another example, after the increased values (the action parameter value corresponding to the unit round) corresponding to the state parameters are respectively determined, weights corresponding to the state parameters are acquired. Weighted summation is performed based on the increased values and the weights corresponding to the state parameters, and then a value obtained by performing weighted summation is used as the final increased value.

In some example embodiments, the terminal may display the picture in which the second virtual object acts in the following manner: acquiring round information of the current round in a case that there are at least two second virtual objects; selecting, from the at least two second virtual objects according to the round information, the second virtual object that acts in a case that the interaction in the current round ends; and displaying a picture in which the selected second virtual object acts.

During actual implementation, there may be a plurality of (two or more) second virtual objects. The server may merely control some of the plurality of second virtual objects to act when controlling the second virtual objects to act. Herein, for different rounds, the second virtual objects that act in a case that the rounds end may be different. The server may preset the second virtual object that acts in each round, and then selects, from the plurality of second virtual objects according to the preset correspondence, the second virtual object that needs to act in a case that the interaction in the current round ends, and subsequently, controls the selected second virtual object to act, to display a picture in which the selected second virtual object acts on a terminal side corresponding to the first virtual object.

Herein, in a case that a plurality of (two or more) second virtual objects are selected by the server, actions executed by the selected second virtual objects may be the same or different. For example, in a case that there are three selected second virtual objects, the server may control the three selected second virtual objects to move (such as jumping, sprinting, and the like) in the virtual scene, or may control one of the second virtual objects to move (such as jumping, sprinting, or the like) in the virtual scene, and control the other two second virtual objects to attack the first virtual object.

In some example embodiments, the terminal may display the picture in which the second virtual object acts in the following manner: acquiring object information about the second virtual object; and determining an action manner corresponding to the object information according to the object information about the second virtual object, and displaying a picture in which the second virtual object performs a corresponding action in the action manner corresponding to the object information.

Herein, the object information may be a type of the second virtual object, state information of the second virtual object, or the like, where the state information of the second virtual object may be a position, a presentation form, a health point, or the like of the second virtual object. Different action manners may be determined for different object information, and then the server controls the second virtual object to act in a corresponding action manner.

For example, in a case that the object information is the type of the second virtual object, the server presets an action manner corresponding to each type, and controls the second virtual object to move in an action manner corresponding to a corresponding type. For example, in a case that the second virtual object is a cat, the second virtual object is controlled to move in a jumping manner, that is, a picture in which the second virtual object moves in the jumping manner is displayed; and in a case that the second virtual object is a bird, the second virtual object is controlled to move in a flying manner, that is, a picture in which the second virtual object moves in the flying manner is displayed.

In some example embodiments, the terminal may further display an upgrade icon in the picture in a case that the action parameter value of the first virtual object reaches a target value, and upgrade an interaction level corresponding to the interaction operation in a case that a trigger operation for the upgrade icon is received.

In actual application, a plurality of interaction levels may be set for the interaction operation. Interaction forces of the interaction operation corresponding to different interaction levels are different. For example, in a case that the interaction operation is an attack operation, the higher the interaction level is, the greater the damage caused by the corresponding attack operation is. The interaction level of the interaction operation may be upgraded in a case that the action parameter value reaches the target value. Herein, the interaction level may be upgraded by one or more levels (two or more levels) in a case that the interaction level of the interaction operation is upgraded.

In actual application, the action parameter value required for upgrading by one level may be preset, for example, the action parameter value required for upgrading by one level is the target value. In a case that the action parameter value of the first virtual object reaches the target value, the interaction level corresponding to the interaction operation may be upgraded by one level. In a case that the action parameter value of the first virtual object reaches twice the target value, the interaction level corresponding to the interaction operation may be upgraded by two levels.

Figure 9:
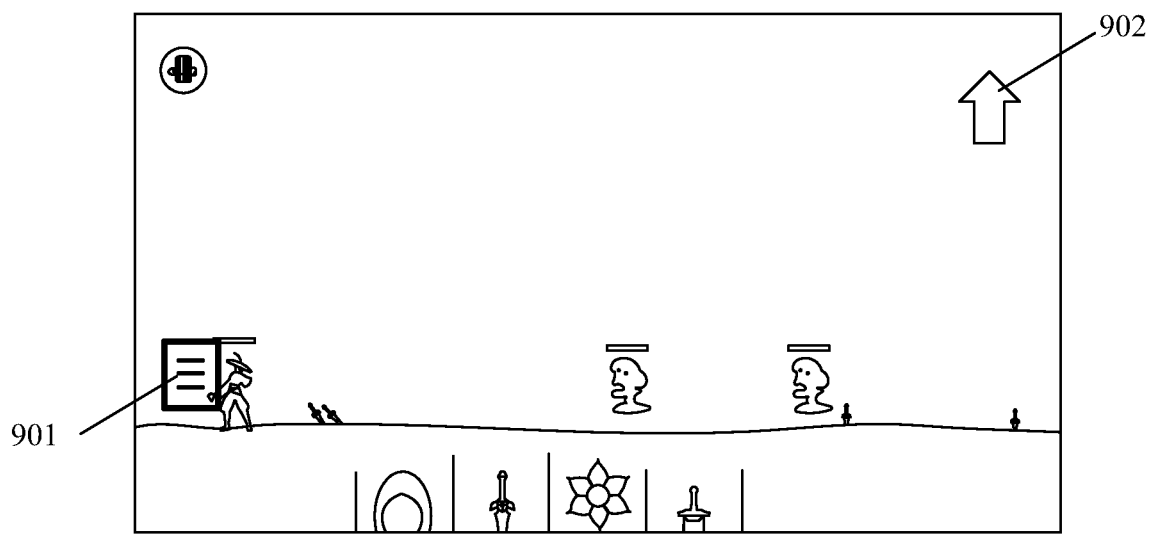
FIG. 9 is a schematic diagram of a picture of a virtual scene according to an example embodiment of the disclosure.

For example, FIG. 9 is a schematic diagram of a picture of a virtual scene according to an example embodiment of the disclosure. Referring to FIG. 9, a target quantity of interaction identifiers 901 are displayed in the associated region of the first virtual object. In a case that the interaction identifier 901 indicates that the action parameter value of the first virtual object reaches the target value, an upgrade icon 902 is displayed in the picture of the virtual scene. In a case that a user triggers the upgrade icon, for example, the user taps the upgrade icon, the terminal upgrades the interaction level corresponding to the interaction operation by one level in response to a trigger operation for the upgrade icon.

Step 403: Control, in a case that an interaction execution instruction for the first virtual object is received, the first virtual object to execute an interaction operation for the second virtual object in an action process of the second virtual object.

Herein, the action parameter value is consumed in a case that the first virtual object executes the interaction operation for the second virtual object. During actual implementation, the user may trigger the interaction execution instruction for the first virtual object at any moment. In a case that the action parameter value is not zero, the terminal may control the first virtual object to execute the interaction operation for the second virtual object. Since the action parameter value is consumed in a case that the interaction operation is executed, the action parameter value of the first virtual object is reduced in a process in which the first virtual object is controlled to execute the interaction operation for the second virtual object.

In some example embodiments, after reducing the action parameter value, the terminal may further control the first virtual object to be in a static state in response to the interaction execution instruction for the first virtual object in a case that the action parameter value is reduced to zero, and display prompt information, to prompt that the first virtual object cannot be controlled to execute the interaction operation for the second virtual object.

During actual implementation, in a case that the action parameter value is zero, the action parameter value cannot be consumed, and therefore the first virtual object cannot be controlled to execute the interaction operation for the second virtual object. Based on this, in a case that the action parameter value is reduced to zero and the interaction execution instruction for the first virtual object is received, the first virtual object cannot be controlled to execute the interaction operation for the second virtual object. In this case, the first virtual object is controlled to be maintained in the static state. In addition, the terminal displays a piece of prompt information, to inform the user that the first virtual object cannot be controlled to execute the interaction operation for the second virtual object, for example, the terminal displays prompt information "the action parameter value is zero, and the interaction operation cannot be executed", to prevent the user from executing an invalid interaction operation.

In some example embodiments, in a case that the action parameter value is reduced to zero, the user cannot trigger the interaction execution instruction for the first virtual object. For example, in a case that the interaction execution instruction for the first virtual object is triggered by triggering an interaction icon and the action parameter value is zero, the interaction icon is set to be in an inoperable state (such as an unclickable state), so that the user cannot trigger the interaction execution instruction for the first virtual object.

In some example embodiments, the action parameter value is used for indicating an executable duration for which the first virtual object executes the interaction operation. The terminal may control the first virtual object to execute the interaction operation for the second virtual object and reduce the action parameter value in the following manner: controlling the first virtual object to continuously execute the interaction operation for the second virtual object in a case that the interaction execution instruction for the first virtual object is received; and gradually reducing the action parameter value according to an execution duration of the interaction operation in a case that the first virtual object continuously executes the interaction operation.

During actual implementation, in a case that the action parameter value is used for indicating the executable duration for which the first virtual object executes the interaction operation, in a process in which the first virtual object executes the interaction operation for the second virtual object, the action parameter value is gradually reduced as the execution duration of the interaction operation increases. Herein, a reduced value of the action parameter value corresponds to (for example, coincides with) the execution duration of the interaction operation.

For example, the action parameter value is displayed in a digital form. For example, in a case that the action parameter value is 10, it indicates that the executable duration for which the first virtual object executes the interaction operation is 10 seconds. In this case, in a case that the interaction execution instruction for the first virtual object is received, for example, the interaction execution instruction is triggered by a user through a pressing operation (for example, pressing the interaction icon), the first virtual object is controlled to execute the interaction operation for the second virtual object in a process of executing the pressing operation, and the action parameter value is controlled to be reduced by a value that is consistent with the execution duration according to the execution duration of the interaction operation in a case that the first virtual object continuously executes the interaction operation. For example, each time the first virtual object executes the interaction operation for 1 second, the action parameter value is controlled to be increased by 1.

In some example embodiments, the terminal may further control the first virtual object to stop executing the interaction operation in a case that the action parameter value is reduced to zero, or an interaction stop instruction for the first virtual object is received.

During actual implementation, in a case that the action parameter value is reduced to zero, it indicates that the executable duration for which the first virtual object executes the interaction operation is zero. In this case, the first virtual object is controlled to stop executing the interaction operation. Alternatively, in a case that the interaction stop instruction for the first virtual object is received, the first virtual object is controlled to stop executing the interaction operation. For example, the interaction execution instruction is triggered through the pressing operation (for example, pressing the interaction icon), and then in a case that the pressing operation is released, it is determined that the interaction stop instruction is received, and the first virtual object is controlled to stop executing the interaction operation in response to the interaction stop instruction.

In some example embodiments, the action parameter value is further used for indicating a quantity of executable times that the first virtual object executes the interaction operation. In a case that the interaction execution instruction for the first virtual object is received, the terminal may control the first virtual object to execute the interaction operation for the second virtual object in the following manner: acquiring a target quantity of execution times of the interaction operation indicated by the interaction execution instruction in a case that the interaction execution instruction for the first virtual object is received; and controlling the first virtual object to execute the interaction operation corresponding to the target quantity of execution times for the second virtual object. Correspondingly, in a process in which the first virtual object executes the interaction operation corresponding to the target quantity of execution times, the terminal may further reduce the executable times that the first virtual object executes the interaction operation, where a corresponding quantity of reduced times is the target quantity of execution times.

In actual application, in a case that the action parameter value is used for indicating the executable times that the first virtual object executes the interaction operation, executable times of the target quantity of execution times is reduced after the first virtual object executes the interaction operation for the target quantity of execution times, that is, a quantity of reduced times of the executable times is consistent with the execution times of the interaction operation by the first virtual object.

In an example, FIG. 9 is a schematic diagram of a picture of a virtual scene according to an example embodiment of the disclosure. Referring to FIG. 9, three interaction identifiers are presented in the associated region of the first virtual object, and the three interaction identifiers indicate that the first virtual object can execute the interaction operation for three times. Assuming that a quantity of times of executing the interaction operation indicated by each interaction execution instruction is 1, after the interaction execution instruction for the first virtual object is received, the first virtual object is controlled to execute the interaction operation for one time for the second virtual object, and presentation of one interaction identifier is canceled.

In some example embodiments, the action parameter value is further used for indicting a level of the interaction operation executed by the first virtual object. After receiving the interaction execution instruction for the first virtual object, the terminal may control the first virtual object to execute the interaction operation for the second virtual object and reduce the action parameter value in the following manner: determining a level of an interaction operation corresponding to a current action parameter value of the first virtual object in a case that the interaction execution instruction for the first virtual object is received; and controlling the first virtual object to execute an interaction operation corresponding to the level for the second virtual object, and reducing the action parameter value of the first virtual object to zero.

During actual implementation, different action parameter values may indicate levels of different interaction operations. For example, the action parameter value is in direct proportion to the level of the interaction operation, that is, the higher the action parameter value is, the higher the level of the corresponding interaction operation is. A correspondence between the action parameter value and the level of the interaction operation may be one-to-one, or one-to-many, and this is not limited herein.

In an example, the action parameter value is 1, 2, 3, or 4, and levels of corresponding interaction operations are respectively level one, level two, level three, or level four. In a case that the action parameter value is 1, if the interaction execution instruction for the first virtual object is received, the first virtual object is controlled to execute a level-one interaction operation. In a case that the action parameter value is accumulated to 3, if the interaction execution instruction for the first virtual object is received, the first virtual object is controlled to execute a level-three interaction operation.

In some example embodiments, the terminal may display at least two attack selection items in the picture; and receive a selection operation for a target attack selection item in the at least two attack selection items, and use an attack operation corresponding to the target attack selection item as the interaction operation. Correspondingly, the terminal may control the first virtual object to execute the interaction operation for the second virtual object and reduce the action parameter value in the following manner: controlling the first virtual object to execute the attack operation corresponding to the target attack selection item for the second virtual object in a case that the interaction execution instruction for the first virtual object is received; and controlling the action parameter value of the first virtual object to be reduced, where a corresponding reduced value corresponds to an attack strength of the attack operation corresponding to the target attack selection item.

During actual implementation, different attack operations may be set, and each attack selection item corresponds to one attack operation. For example, different weapons such as a sword and a boomerang may be set. A user may select a corresponding attack operation through the attack selection item, to control the first virtual object to execute the corresponding attack operation. Each attack operation corresponds to an attack strength. In a case that the attack operations with different attack strengths are executed, the action parameter value is consumed differently. That is, the reduced value of the action parameter value corresponds to the attack strength of the attack operation, for example, the higher the attack strength is, the greater the reduced value of the corresponding action parameter value is.

Figure 10:
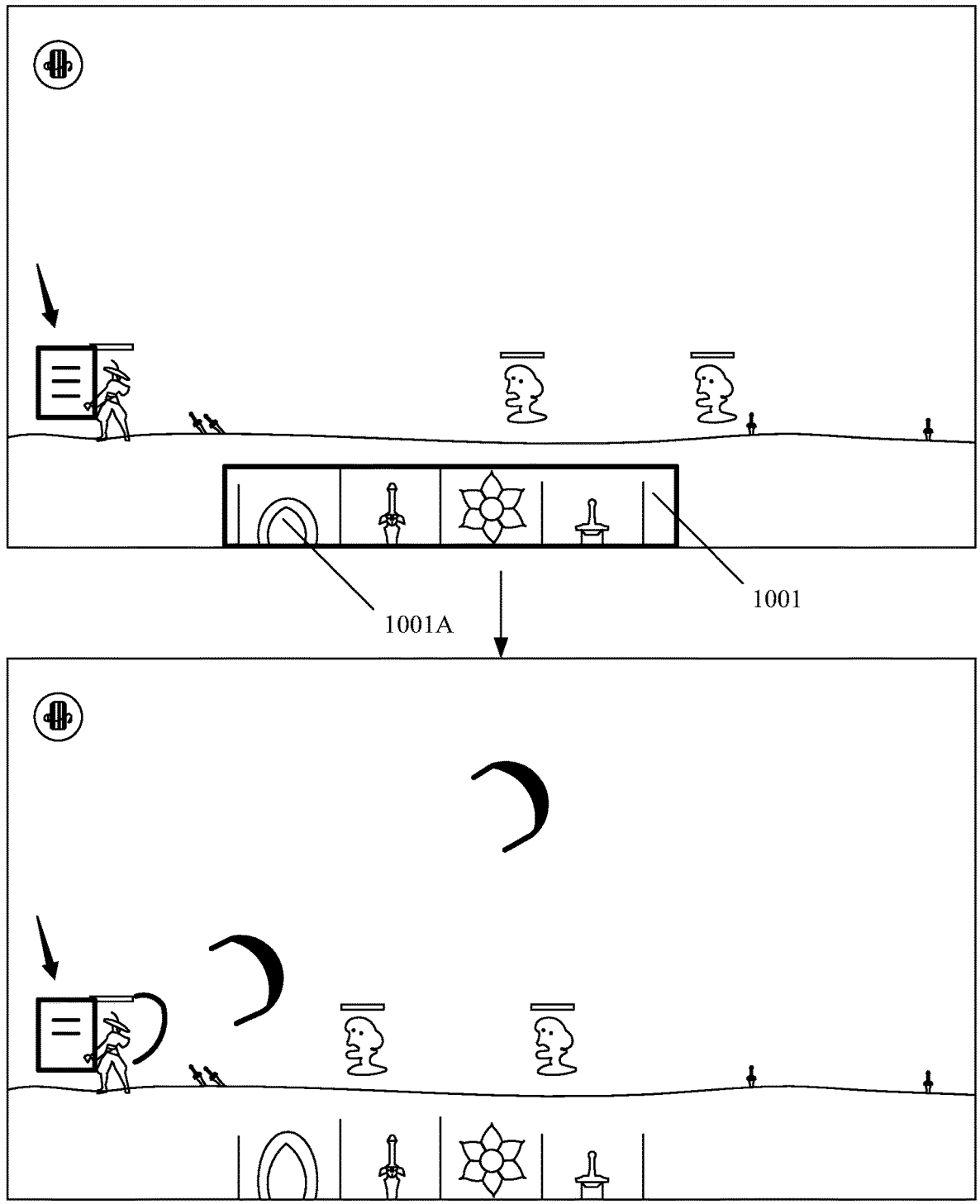
FIG. 10 is a schematic diagram of a picture of a virtual scene according to an example embodiment of the disclosure.

FIG. 10 is a schematic diagram of a picture of a virtual scene according to an example embodiment of the disclosure. Referring to FIG. 10, four attack selection items 1001 are displayed in the picture of the virtual scene, and the user may select one of the four attack selection items as the target attack selection item. For example, in a case that the target attack selection item selected by the user is 1001A, an attack operation corresponding to the target attack selection item is to discharge power of a sword. In this case, in a case that the interaction execution instruction for the first virtual object is received, the first virtual object is controlled to discharge the power of the sword to the second virtual object. Herein, the reduced value of the action parameter value corresponding to an attack strength of the attack operation is 1. Therefore, the quantity of the action identifiers is reduced from 3 to 2, to indicate that the action parameter value is reduced by 1.

In some example embodiments, in a case that the reduced value corresponding to an attack strength of an attack operation corresponding to a certain attack selection item is greater than the current action parameter value, the corresponding attack operation cannot be triggered. For example, in a case that the attack strength corresponding to the target attack selection item is 3, the reduced value of the action parameter value is correspondingly 3, but in a case that the current action parameter value is only 2, the attack operation corresponding to the target attack selection item cannot be triggered. Herein, the terminal may display one piece of prompt information, to prompt the user that the action parameter value is insufficient to execute the attack operation corresponding to the target attack selection item.

In some example embodiments, the terminal may further reduce the health point of the second virtual object according to the reduced value of the action parameter value of the first virtual object, and cancel presentation of the second virtual object in the picture in a case that the reduced health point of the second virtual object is less than a health point threshold.

During actual implementation, a corresponding value of the health point is reduced in a case that the second virtual object receives the attack operation executed by the first virtual object. Since the reduced value of the action parameter value corresponds to the attack strength, and the reduced value of the health point corresponds the attack strength, it may be determined that the reduced value of the second virtual object also corresponds to the action parameter value. Herein, in a case that the health point of the second virtual object is less than the health point threshold, it indicates that the second virtual object has been killed, and the second virtual object is no longer presented in the picture, to avoid unnecessary occupation of the display screen.

In some example embodiments, in a case that the round progress indication information indicates that the interaction in the current round ends, the terminal may further acquire a state parameter of the virtual scene; determine a maximum value of the action parameter value corresponding to the state parameter; and stop increasing the action parameter value of the first virtual object in a case that the action parameter value of the first virtual object reaches the maximum value of the action parameter value in a process of increasing the action parameter value of the first virtual object.

During actual implementation, the action parameter value has an upper limit, that is, the maximum value of the action parameter value. The action parameter value cannot be increased in a case that the action parameter value reaches the maximum value of the action parameter value. In this case, the terminal stops controlling the action parameter value of the first virtual object to be increased. Herein, the maximum value of the action parameter value is affected by the state parameter of the virtual scene, where the state parameter includes at least one of the following: a task difficulty coefficient, a task progress, or object information of the first virtual object. For example, the higher the task difficulty coefficient is, the greater the maximum value of the corresponding action parameter value is.

By applying the example embodiments of the disclosure, a first virtual object, a second virtual object interacting with the first virtual object, and round progress indication information are presented in a virtual scene, the round progress indication information indicating a progress of interaction between the first virtual object and the second virtual object in a current round; an action parameter value of the first virtual object is increased in a case that the round progress indication information indicates that the interaction in the current round ends, and a picture in which the second virtual object acts is displayed; and in an action progress of the second virtual object, the first virtual object is controlled to execute an interaction operation for the second virtual object and reduce the action parameter value in a case that an interaction execution instruction for the first virtual object is received. In this way, in a case that the current round ends, only the action parameter value of the first virtual object is increased and there is no need to immediately control the first virtual object to execute the interaction operation for the second virtual object, which enables a timing for the first virtual object to execute the interaction operation for the second virtual object to be more flexibly. In addition, the second virtual object acts only in a case that the current round ends, so that a user can predict a behavior of the second virtual object, thereby controlling the first virtual object more effectively.

Figure 11:
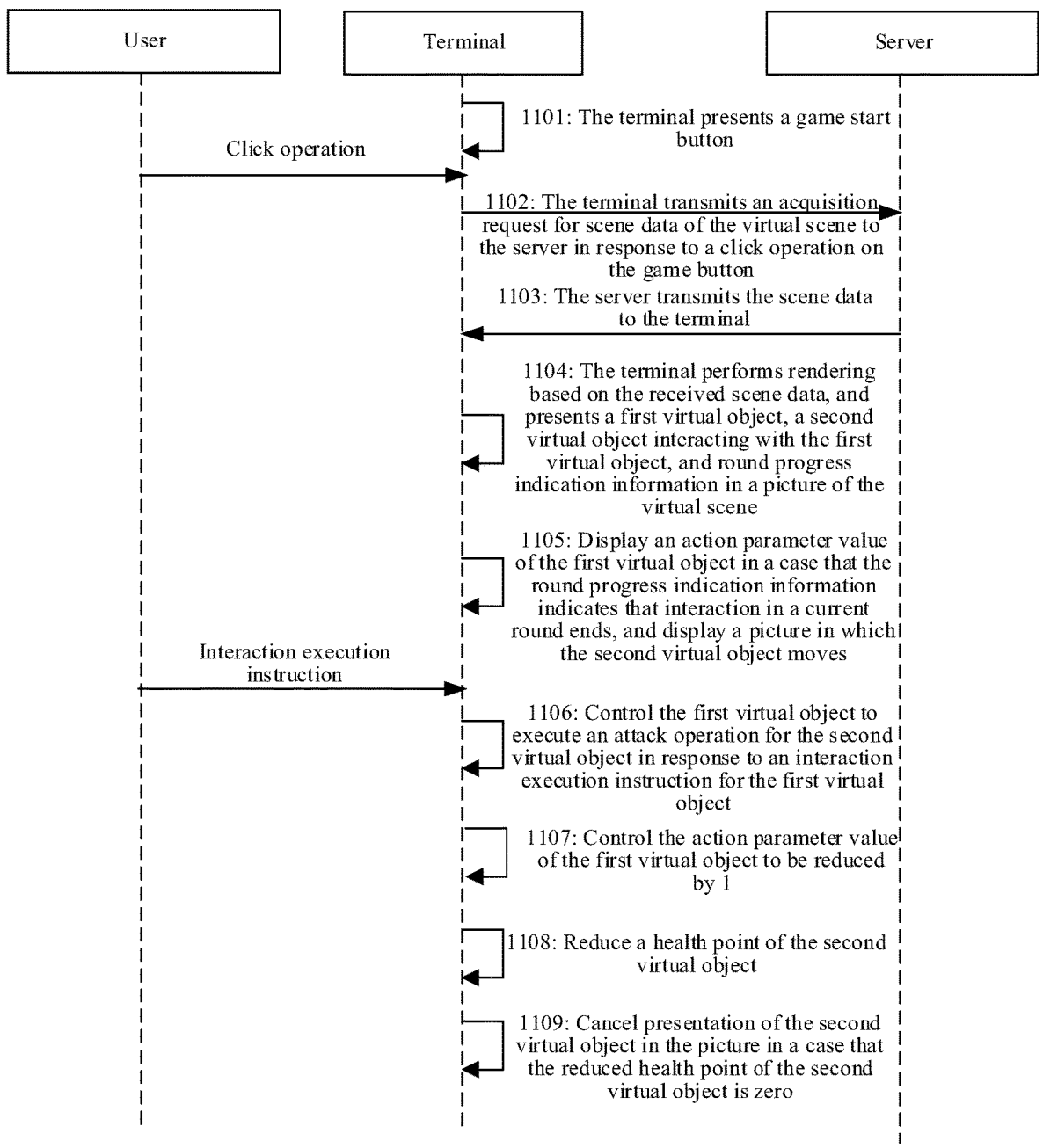
FIG. 11 is a schematic flowchart of a method for controlling a virtual object according to an example embodiment of the disclosure.

The following continuously describes a method for controlling a virtual object according to an example embodiment of the disclosure. The method for controlling a virtual object is implemented by a terminal and a server in cooperation. FIG. 11 is a schematic flowchart of the method for controlling a virtual object according to this example embodiment of the disclosure. Referring to FIG. 11, the method for controlling a virtual object according to this example embodiment of the disclosure includes:

Operation 1101: The terminal presents a game start button.

Operation 1102: The terminal transmits an acquisition request for scene data of the virtual scene to the server in response to a click operation on the game button.

Operation 1103: The server transmits the scene data to the terminal.

Operation 1104: The terminal performs rendering based on the received scene data, and presents a first virtual object, a second virtual object interacting with the first virtual object, and round progress indication information in a picture of a virtual scene.

Herein, the round progress indication information is cyclically displayed, and each cycle corresponds to a round. For each cycle, a change of a display form of the round progress indication information matches a change of a progress of a corresponding round.

Operation 1105: The terminal increases an action parameter value of the first virtual object in a case that the round progress indication information indicates that interaction in a current round ends, and displays a picture in which the second virtual object moves.

Operation 1106: The terminal controls the first virtual object to execute an attack operation for the second virtual object in response to an interaction execution instruction for the first virtual object.

Operation 1107: The terminal controls the action parameter value of the first virtual object to be reduced by 1.

Operation 1108: The terminal reduces a health point of the second virtual object.

Herein, a reduced value of the health point is determined according to a type of an attack operation.

Operation 1109: The terminal cancels presentation of the second virtual object in the picture in a case that the reduced health point of the second virtual object is zero.

Herein, in a case that the health point of the second virtual object is zero, it indicates that the second virtual object is killed by the first virtual object. Displaying of the second virtual object that has been killed in the picture is canceled, which can avoid unnecessary occupation of the display screen.

By applying the foregoing embodiment, in a case that the current round ends, only the action parameter value of the first virtual object is increased and there is no need to immediately control the first virtual object to execute the interaction operation for the second virtual object, which enables a timing for the first virtual object to execute the interaction operation for the second virtual object to be more flexibly. In addition, the second virtual object acts only in a case that the current round ends, so that a user can predict a behavior of the second virtual object, thereby controlling the first virtual object more effectively.

The following describes an exemplary application of this example embodiment of the disclosure in an actual application scene. An example in which the virtual scene is a game is used herein. During actual implementation, the first virtual object (a player character) provided in this example embodiment of the disclosure acts based on action points (the action parameter value), and the second virtual object (an enemy) acts based on a round. In the picture of the virtual scene, a progress of a current round is displayed and identified. In a case that a round ends, the enemy directly acts, such as moving, power accumulating, or attacking, and the first virtual object obtains an action point. Herein, the action point may be displayed by using an action identifier, and each action point corresponding to an action identifier.

In an example, referring to FIG. 6, a round time is continuously consumed and is not affected by any other factors. That is, in an ongoing process of each round, with a change of a progress of the round, a progress in which a current progress point 602 moves from a start position of the progress bar to an end position is displayed, that is, a progress in which the current progress point 602 moves from left to right is displayed. Herein, in a case that the current progress point moves to the end position 603, it indicates that the interaction in the current round ends. In this case, the current progress point returns to the start position, to re-enter a next round. Then, in the next round that is newly entered, a progress in which the current progress point moves from the start position to the end position is displayed, to cyclically display the round progress indication information.

During actual implementation, an action manner of the second virtual object is affected by a type and state information of the second virtual object. However, the second virtual object needs to act once in a case that each round ends.

Correspondingly, the player character obtains action points in a case that each round ends. Herein, the action point can be accumulated. Action points obtained in a case that each round ends and a maximum quantity of action points that can be accumulated are affected by a progress of the game.

In actual application, as long as there is an action point, a player can immediately trigger an interaction instruction, to consume the action point and control the first virtual object to act, for example, to launch an attack. That is, an action of the first virtual object is only indirectly affected by the round time. The action points recovered for the first virtual object during round time may not be consumed immediately, and then the first virtual object is controlled to act by consuming the action points in any process of the game.

Figure 12:
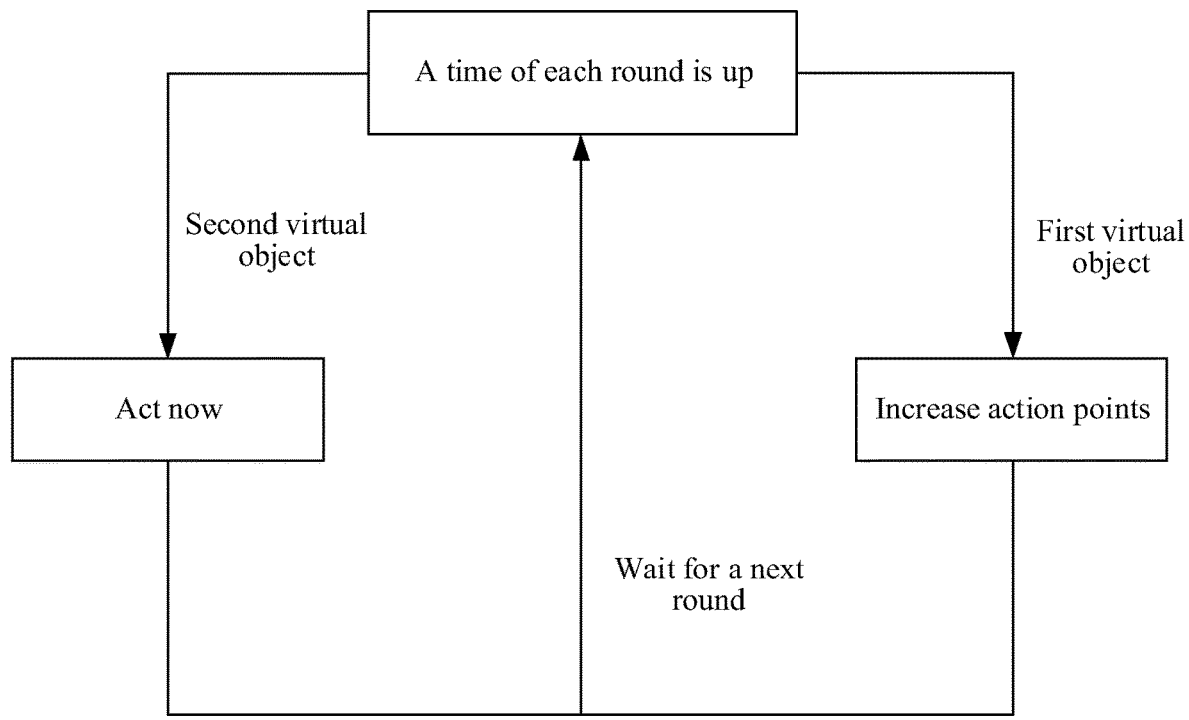
FIG. 12 is a schematic flowchart of controlling a virtual object according to an example embodiment of the disclosure.

FIG. 12 is a schematic flowchart of controlling a virtual object according to an example embodiment of the disclosure. Referring to FIG. 12, a system (the server) distinguishes the first virtual object from the second virtual object in a case that each round ends. For the first virtual object, the action points are added to the first virtual object, and for the second virtual object, the second virtual object is made to act immediately.

Figure 13:
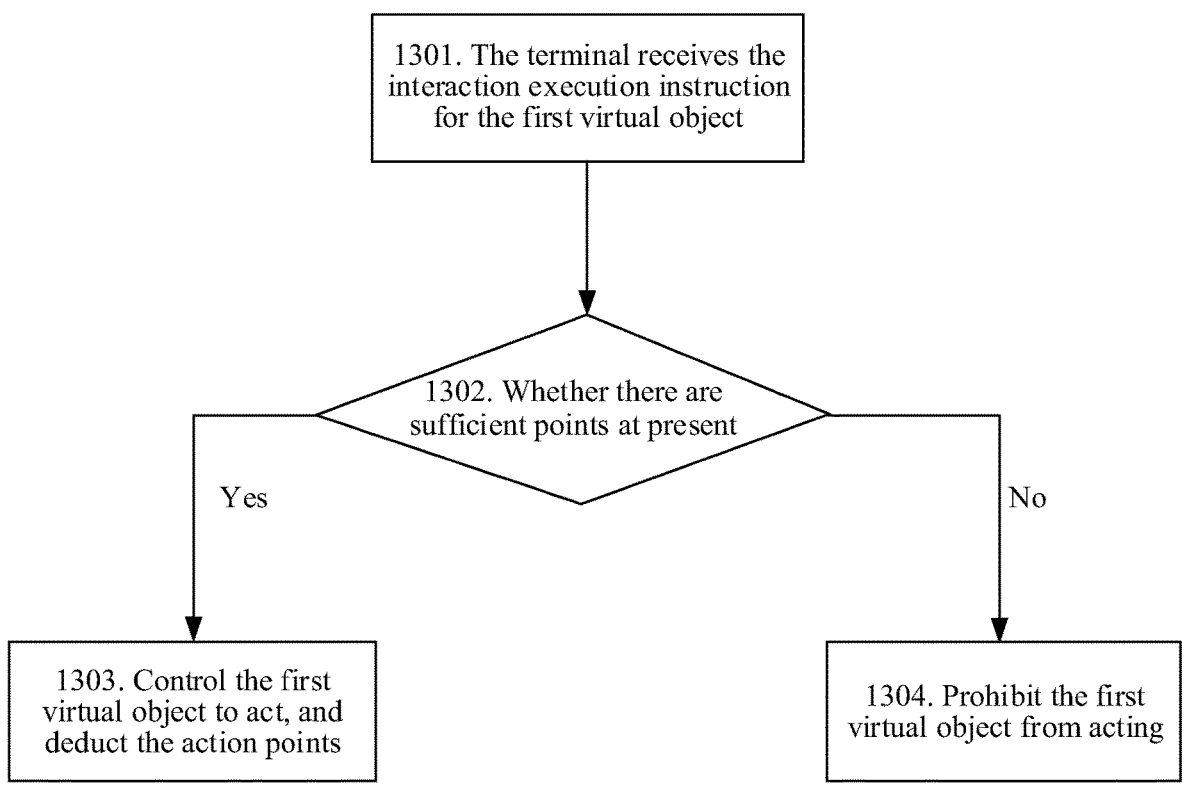
FIG. 13 is a schematic flowchart of controlling a virtual object according to an example embodiment of the disclosure.

FIG. 13 is a schematic flowchart of controlling a virtual object according to an example embodiment of the disclosure. Referring to FIG. 13, in operation 1301, the terminal receives the interaction execution instruction for the first virtual object; in operation 1302, the terminal determines whether there are sufficient action points at present in response to the interaction execution instruction, where in a case that it is determined that there are sufficient action points at present, operation 1303 is performed, and in a case that it is determined that the action points are not sufficient at present, operation 1304 is performed; in operation 1303, the first virtual object is controlled to act, and the action points deducted; and in operation 1304, the first virtual object is not allowed to act.

Application of the foregoing example embodiments has the following beneficial effects:
1. The second virtual object (enemy) enables the user to predict a behavior of the enemy according to an action manner in each round, to make the game be strategic.
2. The round time is continuously consumed and incessant, thereby enabling the game to have a sense of tension of a real-time game, which is unlike a turn-based game that gives a time to stop and think.
3. The game player obtains the action points in each round, and the action points are consumed in a case that an attack is launched, to allow the user to have more free and coherent game experience, thereby enabling the game to be more strategic.

The following continuously describes an exemplary structure of the apparatus 555 for controlling a virtual object that is implemented as software modules and that is provided in the example embodiments of the disclosure. In some example embodiments, as shown in FIG. 3, the software modules in the apparatus 555 for controlling a virtual object stored in the memory 550 may include:
- a display module 5551, configured to present a first virtual object, a second virtual object interacting with the first virtual object, and round progress indication information,
- the round progress indication information indicating a progress of interaction between the first virtual object and the second virtual object in a current round;
- a first control module 5552, configured to increase an action parameter value of the first virtual object in a case that the round progress indication information indicates that the interaction in the current round ends, and display a picture in which the second virtual object acts; and
- a second control module 5553, configured to control, in a case that an interaction execution instruction for the first virtual object is received, the first virtual object to execute an interaction operation for the second virtual object in an action process of the second virtual object.

In some example embodiments, the display module may be further configured to cyclically displays the round progress indication information in the picture of the virtual scene, where each cycle corresponds to a round, and
for each cycle, a change of a display form of the round progress indication information matches a change of a progress of a corresponding round.

In some example embodiments, the first control module is further configured to control a target quantity of action identifiers to be increased in an associated region of the first virtual object in a case that the round progress indication information indicates that the interaction in the current round ends, to indicate that the action parameter value of the first virtual object is increased, where
the associated region is used for presenting a quantity of action identifiers corresponding to the action parameter value.

In some example embodiments, the first control module is further configured to control, in a case that the action parameter value is represented by using a display style of an action identifier and the round progress indication information indicates that the interaction in the current round ends,
a display style of an action identifier of the first virtual object to be changed from a first display style to a second display style, where
the first display style corresponds to the action parameter value of the first virtual object in a case that the interaction ends, and the second display style corresponds to an action parameter value corresponding to a unit round.

In some example embodiments, the first control module is further configured to acquire a state parameter of the virtual scene and an action parameter value corresponding to a unit round corresponding to the state parameter in a case that the round progress indication information indicates that the interaction in the current round ends, where
the state parameter includes at least one of the following: a task difficulty coefficient, a task progress, or object information of the first virtual object; and
increasing the action parameter value of the first virtual object, where a corresponding increased value is the action parameter value corresponding to the unit round.

In some example embodiments, the action parameter value is used for indicating an executable duration for which the first virtual object executes the interaction operation; and
the second control module is further configured to: control the first virtual object to continuously execute the interaction operation for the second virtual object in a case that the interaction execution instruction for the first virtual object is received; and
gradually reduce the action parameter value according to an execution duration of the interaction operation in a case that the first virtual object continuously executes the interaction operation.

In some example embodiments, the first control module is further configured to control the first virtual object to stop executing the interaction operation in a case that the action parameter value is reduced to zero or an interaction stop instruction for the first virtual object is received.

In some example embodiments, the action parameter value is used for indicating a quantity of executable times that the first virtual object executes the interaction operation; and
the second control module is further configured to: acquire a target quantity of execution times of the interaction operation indicated by the interaction execution instruction in a case that the interaction execution instruction for the first virtual object is received;
control the first virtual object to execute the interaction operation corresponding to the target quantity of execution times for the second virtual object; and
reduce the quantity of executable times that the first virtual object executes the interaction operation, where a corresponding quantity of reduced times is the target quantity of execution times.

In some example embodiments, the action parameter value is used for indicting a level of the interaction operation executed by the first virtual object; and the controlling, in a case that an interaction execution instruction for the first virtual object is received, the first virtual object to execute an interaction operation for the second virtual object, and reducing the action parameter value includes:

determining a level of an interaction operation corresponding to a current action parameter value of the first virtual object in a case that the interaction execution instruction for the first virtual object is received; and controlling the first virtual object to execute the interaction operation corresponding to the level for the second virtual object, and reducing the action parameter value of the first virtual object to zero.

In some example embodiments, the display module is further configured to: display at least two attack selection items in the picture; and receive a selection operation for a target attack selection item in the at least two attack selection items, and use an attack operation corresponding to the target attack selection item as the interaction operation.

The second control module is further configured to: control the first virtual object to execute the attack operation corresponding to the target attack selection item for the second virtual object in a case that the interaction execution instruction for the first virtual object is received; and reduce the action parameter value of the first virtual object, where a corresponding reduced value corresponds to an attack strength of the attack operation corresponding to the target attack selection item.

In some example embodiments, the second control module is further configured to: reduce a health point of the second virtual object according to the reduced value of the action parameter value of the first virtual object; and cancel presentation of the second virtual object in the picture in a case that the reduced health point of the second virtual object is less than a health point threshold.

In some example embodiments, the second control module is further configured to: acquire round information of the current round in a case that there are at least two second virtual objects; and select, from the at least two second virtual objects according to the round information, the second virtual object that acts in a case that the interaction in the current round ends; and display a picture in which the selected second virtual object acts.

In some example embodiments, the second control module is further configured to: acquire object information of the second virtual object; and determine an action manner corresponding to the object information according to the object information about the second virtual object, and display a picture in which the second virtual object performs a corresponding action in the action manner.

In some example embodiments, the second control module is further configured to: control the first virtual object to be in a static state in response to the interaction execution instruction for the first virtual object in a case that the action parameter value is reduced to zero; and display prompt information, where the prompt information is used for prompting that the first virtual object cannot be controlled to execute the interaction operation for the second virtual object.

In some example embodiments, the second control module is further configured to: display an upgrade icon in the picture in a case that the action parameter value of the first virtual object reaches a target value; and upgrade an interaction level corresponding to the interaction operation in a case that a trigger operation for the upgrade icon is received.

In some example embodiments, the first control module is further configured to: acquire a state parameter of the virtual scene;

determine a maximum value of the action parameter value corresponding to the state parameter; and stop increasing the action parameter value of the first virtual object in a case that the action parameter value of the first virtual object reaches the maximum value of the action parameter value in a process of increasing the action parameter value of the first virtual object.

An example embodiment of the disclosure provides a computer program product or a computer program, the computer program product or the computer program including computer instructions, the computer instructions being stored in a computer-readable storage medium. A processor of a computer device reads the computer instructions from the computer-readable storage medium, and executes the computer instructions, to cause the computer device to perform the foregoing method for controlling a virtual object in the example embodiments of the disclosure.

An example embodiment of the disclosure provides a computer-readable storage medium storing an executable instruction. When the executable instruction is executed by a processor, the processor is caused to perform the method in the example embodiments of the disclosure, such as the method shown in FIG. 4.

In some example embodiments, the computer-readable storage medium may be a memory such as an FRAM, a ROM, a PROM, an EPROM, an EEPROM, a flash memory, a magnetic memory, a compact disc, or a CD-ROM; or may be various devices comprising one of or any combination of the foregoing memories.

In some example embodiments, the executable instructions may be written in any form of programming language (including a compiled or interpreted language, or a declarative or procedural language) by using the form of a program, software, a software module, a script or code, and may be deployed in any form, including being deployed as an independent program or being deployed as a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

In an example, the executable instructions may be deployed to be executed on a computing device, or deployed to be executed on a plurality of computing devices at the same location, or deployed to be executed on a plurality of computing devices that are distributed in a plurality of locations and interconnected by using a communication network.

The foregoing descriptions are merely example embodiments of the disclosure and are not intended to limit the protection scope of the disclosure. Any modification, equivalent replacement, or improvement made without departing from the spirit and range of the disclosure shall fall within the protection scope of the disclosure.

What is claimed is:

1. A method for controlling a virtual object, performed by a computer device, and the method comprising:
presenting a first virtual object, a second virtual object interacting with the first virtual object, and round indication information in a virtual scene,
the round indication information indicating a current round being for the first virtual object or the second virtual object to act;
increasing an action parameter value of the first virtual object based on a round for the first virtual object ending and a round for the second virtual object beginning; and
controlling, based on an interaction execution instruction for the first virtual object being received, the first virtual object to execute an interaction operation for the second virtual object in the round for the second virtual object,
wherein the action parameter value indicates an executable duration for which the first virtual object executes the interaction operation,
wherein the controlling, based on the interaction execution instruction for the first virtual object being received, the first virtual object to execute an interaction operation for the second virtual object comprises:
controlling the first virtual object to continuously execute the interaction operation for the second virtual object based on the interaction execution instruction for the first virtual object being received, and
wherein the method further comprises gradually reducing the action parameter value according to an execution duration of the interaction operation based on the first virtual object continuously executing the interaction operation.

2. The method for controlling the virtual object according to claim 1, wherein the round indication information further indicates a progress of the current round.

3. The method for controlling the virtual object according to claim 1, wherein controlling the first virtual object to execute an interaction operation for the second virtual object in the round for the second virtual object is at cost of an amount of the action parameter value of the first virtual object.

4. The method for controlling the virtual object according to claim 1, further comprising:
cyclically displaying the round indication information in a picture of the virtual scene, wherein each cycle corresponds to a round, and
for each cycle, a change of a display form of the round indication information matches a change of a progress of a corresponding round.

5. The method for controlling the virtual object according to claim 1, wherein the increasing comprises:
controlling a target quantity of action identifiers to be increased in an associated region of the first virtual object based on the round indication information indicating that the interaction in the current round ends, to indicate that the action parameter value of the first virtual object is increased, wherein
the associated region is used for presenting a quantity of action identifiers corresponding to the action parameter value.

6. The method for controlling the virtual object according to claim 1, wherein the increasing comprises:
controlling, based on the action parameter value being represented by using a display style of an action identifier and the round indication information indicating that the interaction in the current round ends,
a display style of an action identifier of the first virtual object to be changed from a first display style to a second display style, wherein
the first display style corresponds to the action parameter value of the first virtual object based on the interaction ending, and the second display style corresponds to an action parameter value corresponding to a unit round.

7. The method for controlling the virtual object according to claim 1, wherein the increasing comprises:
acquiring a state parameter of the virtual scene and an action parameter value corresponding to a unit round corresponding to the state parameter based on the round indication information indicating that the interaction in the current round ends, wherein
the state parameter comprises at least one of the following: a task difficulty coefficient, a task progress, or object information of the first virtual object; and
increasing the action parameter value of the first virtual object, wherein a corresponding increased value is the action parameter value corresponding to the unit round.

8. The method for controlling the virtual object according to claim 1, further comprising:
controlling the first virtual object to stop executing the interaction operation based on the action parameter value being reduced to zero or an interaction stop instruction for the first virtual object being received.

9. The method for controlling the virtual object according to claim 1, wherein the action parameter value indicates a quantity of executable times that the first virtual object executes the interaction operation;
the controlling, based on an interaction execution instruction for the first virtual object being received, the first virtual object to execute an interaction operation for the second virtual object comprises:
acquiring a target quantity of execution times of the interaction operation indicated by the interaction execution instruction based on the interaction execution instruction for the first virtual object being received; and
controlling the first virtual object to execute the interaction operation corresponding to the target quantity of execution times for the second virtual object; and
the method further comprises:
reducing the quantity of executable times that the first virtual object executes the interaction operation in a process in which the first virtual object executes the interaction operation corresponding to the target quantity of execution times, wherein a corresponding quantity of reduced times is the target quantity of execution times.

10. The method for controlling the virtual object according to claim 1, wherein the action parameter value indicates a level of the interaction operation executed by the first virtual object; and
the controlling, based on an interaction execution instruction for the first virtual object being received, the first virtual object to execute an interaction operation for the second virtual object comprises:
determining a level of an interaction operation corresponding to a current action parameter value of the first virtual object based on the interaction execution instruction for the first virtual object being received; and controlling the first virtual object to execute the interaction operation corresponding to the level for the second virtual object, and reducing the action parameter value of the first virtual object to zero.

11. The method for controlling the virtual object according to claim 1, further comprising:
displaying at least two attack selection items in the picture; and
receiving a selection operation for a target attack selection item in the at least two attack selection items, and using an attack operation corresponding to the target attack selection item as the interaction operation;
the controlling, based on an interaction execution instruction for the first virtual object being received, the first virtual object to execute an interaction operation for the second virtual object comprises:
controlling the first virtual object to execute the attack operation corresponding to the target attack selection item for the second virtual object based on the interaction execution instruction for the first virtual object being received; and
the method further comprises:
reducing the action parameter value of the first virtual object, wherein a corresponding reduced value corresponds to an attack strength of the attack operation corresponding to the target attack selection item.

12. The method for controlling the virtual object according to claim 11, further comprising:
reducing a health point of the second virtual object according to the reduced value of the action parameter value of the first virtual object; and
canceling presentation of the second virtual object in the picture based on reduced health point of the second virtual object being less than a health point threshold.

13. The method for controlling the virtual object according to claim 1, wherein the displaying a picture in which the second virtual object acts comprises:
acquiring round information of the current round based on at least two second virtual objects being present; and
selecting, from the at least two second virtual objects according to the round information, a second virtual object that acts based on the interaction in the current round ending; and
displaying a picture in which the selected second virtual object acts.

14. The method for controlling the virtual object according to claim 1, further comprising:
displaying an upgrade icon in the picture based on the action parameter value of the first virtual object reaching a target value; and
upgrading an interaction level corresponding to the interaction operation based on a trigger operation for the upgrade icon being received.

15. The method for controlling the virtual object according to claim 1, wherein based on the round indication information indicating that the interaction in the current round ends, the method further comprises:
acquiring a state parameter of the virtual scene;
determining a maximum value of the action parameter value corresponding to the state parameter; and
stopping increasing the action parameter value of the first virtual object based on the action parameter value of the first virtual object reaching the maximum value of the action parameter value in a process of increasing the action parameter value of the first virtual object.

16. An apparatus for controlling a virtual object, comprising:
at least one memory configured to store program code; and
at least one processor configured to read the program code and operate as instructed by the program code, the program code including:
display code configured to cause the at least one processor to present a first virtual object, a second virtual object interacting with the first virtual object, and round indication information in a virtual scene,
the round indication information indicating a current round being for the first virtual object or the second virtual object to act;
first control code configured to cause the at least one processor to increase an action parameter value of the first virtual object based on a round for the first virtual object ending and a round for the second virtual object beginning; and
second control code configured to cause the at least one processor to control, based on an interaction execution instruction for the first virtual object being received, the first virtual object to execute an interaction operation for the second virtual object in the round for the second virtual object,
wherein the action parameter value indicates an executable duration for which the first virtual object executes the interaction operation,
wherein the at least one processor is configured to:
control the first virtual object to continuously execute the interaction operation for the second virtual object based on the interaction execution instruction for the first virtual object being received, and
gradually reduce the action parameter value according to an execution duration of the interaction operation based on the first virtual object continuously executing the interaction operation.

17. The apparatus for controlling the virtual object of claim 16, wherein the program code further comprises:
second display code configured to cause the at least one processor to cyclically display the round indication information in a picture of the virtual scene, wherein each cycle corresponds to a round, and
match code configured to, for each cycle, match a change of a display form of the round indication information and a change of a progress of a corresponding round.

18. The apparatus for controlling the virtual object of claim 16, wherein the program code further comprises:
control code configured to cause the at least one processor to control a target quantity of action identifiers to be increased in an associated region of the first virtual object when the round indication information indicates that the interaction in the current round ends, to indicate that the action parameter value of the first virtual object is increased, and
presenting code configured to cause the at least one processor to present a quantity of action identifiers corresponding to the action parameter value based on the associated region.

19. A non-transitory computer-readable storage medium, storing executable instructions that, when executed by at least one processor, causes the at least one processor to:
present a first virtual object, a second virtual object interacting with the first virtual object, and round indication information in a virtual scene, the round indication information indicating a current round being for the first virtual object or the second virtual object to act;

increase an action parameter value of the first virtual object based on a round for the first virtual object ending and a round for the second virtual object beginning; and control, based on an interaction execution instruction for the first virtual object being received, the first virtual object to execute an interaction operation for the second virtual object in the round for the second virtual object, wherein the action parameter value indicates an executable duration for which the first virtual object executes the interaction operation, wherein the executable instructions, when executed by a processor, cause the at least one processor to:

control the first virtual object to continuously execute the interaction operation for the second virtual object based on the interaction execution instruction for the first virtual object being received, and gradually reduce the action parameter value according to an execution duration of the interaction operation based on the first virtual object continuously executing the interaction operation.

* * * * *